United States Patent [19]

Rabourn et al.

[11] Patent Number: 4,876,760

[45] Date of Patent: Oct. 31, 1989

[54] APPARATUS FOR BUFFING AND OTHERWISE TREATING VEHICLE BODIES

[75] Inventors: William B. Rabourn, Route 1, Box 126, Sedalia, Mo. 65301; Daniel R. Heckart, Sedalia, Mo.

[73] Assignee: William B. Rabourn, Sedalia, Mo.

[21] Appl. No.: 201,574

[22] Filed: Jun. 1, 1988

[51] Int. Cl.$^4$ ............................................. B60S 3/06
[52] U.S. Cl. ................................. 15/97 B; 15/DIG. 2; 51/34 C; 51/56 R; 118/316
[58] Field of Search ............... 15/53 R, 53 A, 53 AB, 15/97 B, 21 R, 21 C; 51/54, 55, 56 R, 410, 416, 429, 34 C; 118/100, 111, 315, 316

[56] References Cited

U.S. PATENT DOCUMENTS 2,258,733 10/1941 Brackett .......................... 15/DIG. 2
2,800,671 8/1957 Nowak .................................. 15/53 R
2,960,707 11/1960 McDermott .......................... 15/53 R

*Primary Examiner*—Edward L. Roberts
*Attorney, Agent, or Firm*—Kokjer, Kircher, Bradley, Wharton, Bowman & Johnson

[57] ABSTRACT

A machine and method for automatically buffing and otherwise treating vehicle bodies. A gantry type frame includes two side columns each carrying an extensible and retractable buffing head that can be driven up and down. An overhead bridge extends between the columns and can be driven up and down on them. Top buffing heads are mounted to move in and out on the bridge and can be extended and retracted toward and away from the top of a vehicle positioned between the columns. The buffing heads are controlled by an electrical and hydraulic system arranged to effect automatic buffing of the vehicle sides and top. The frame is moved along the length of the vehicle in increments selected to effect thorough buffing of the vehicle surfaces.

19 Claims, 11 Drawing Sheets

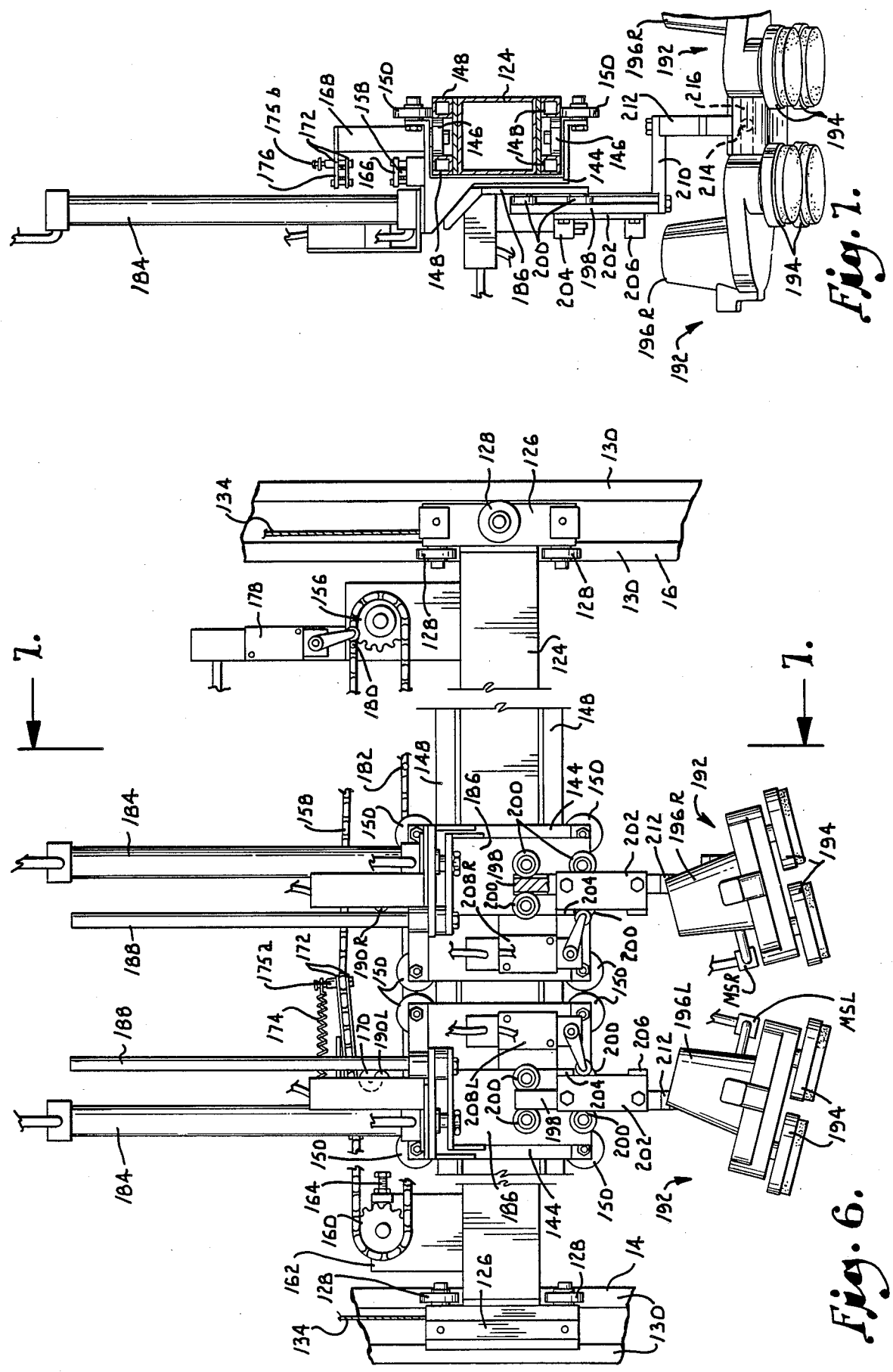

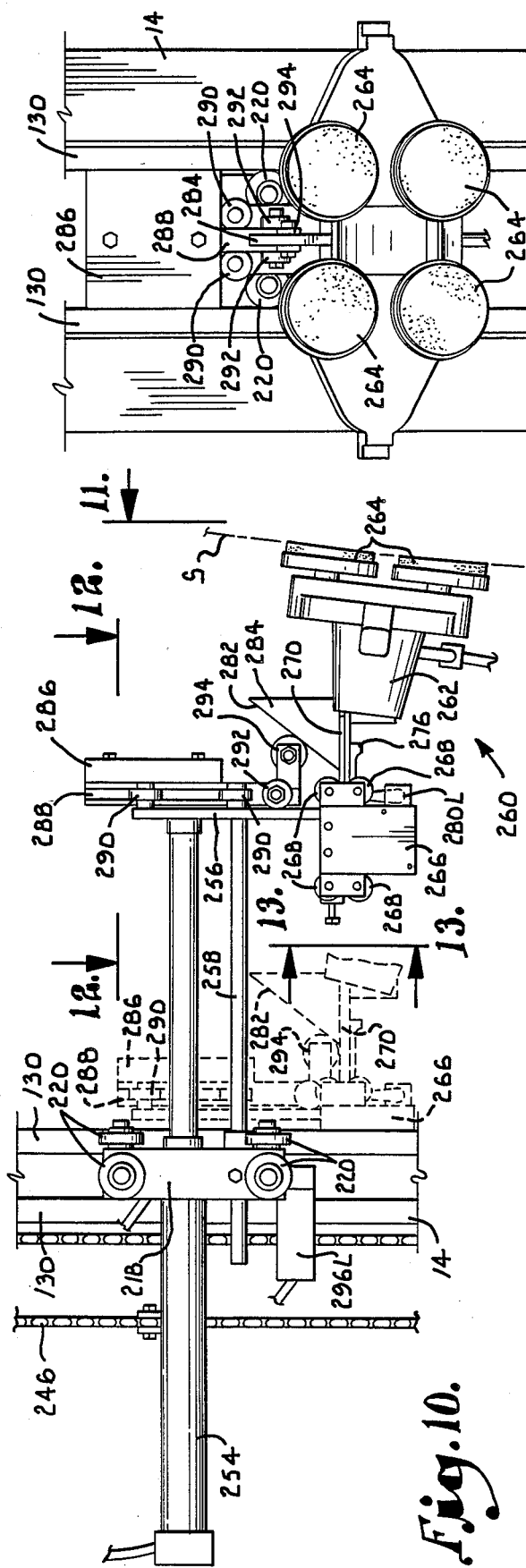
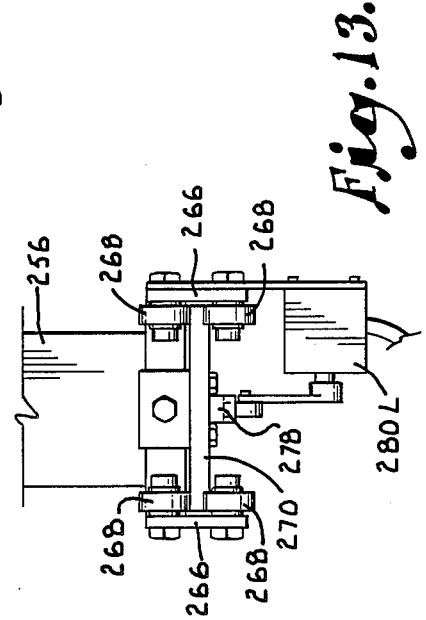
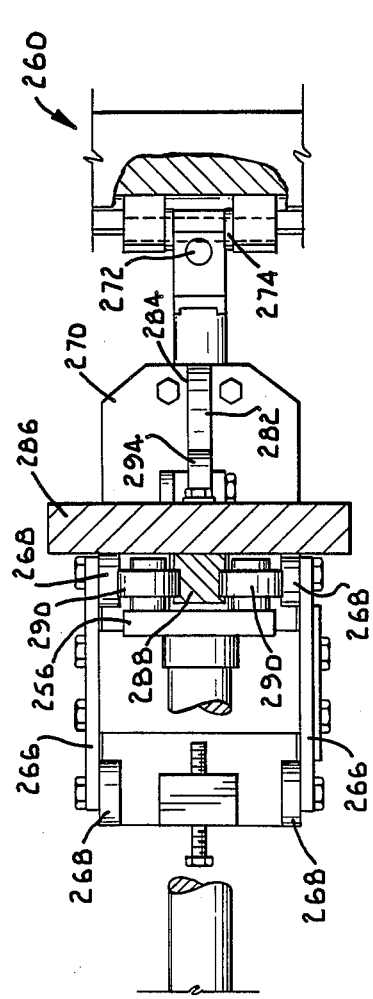

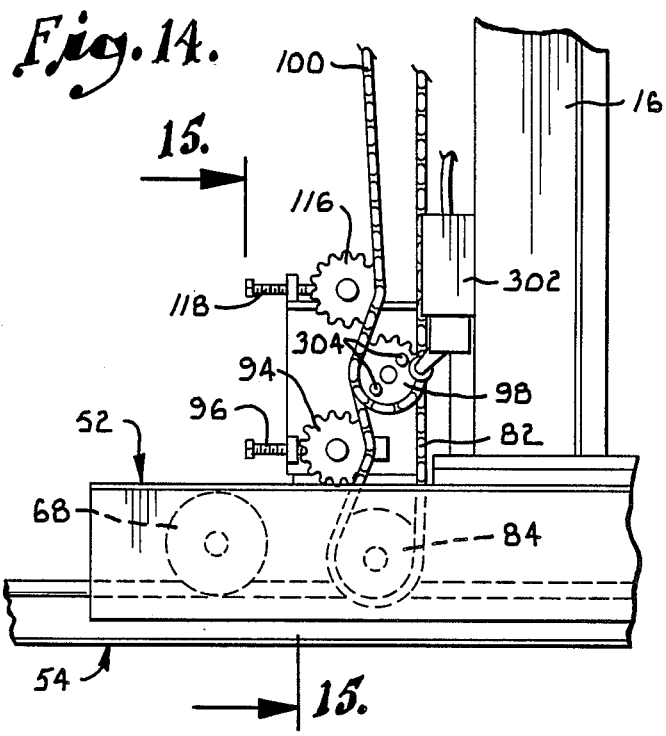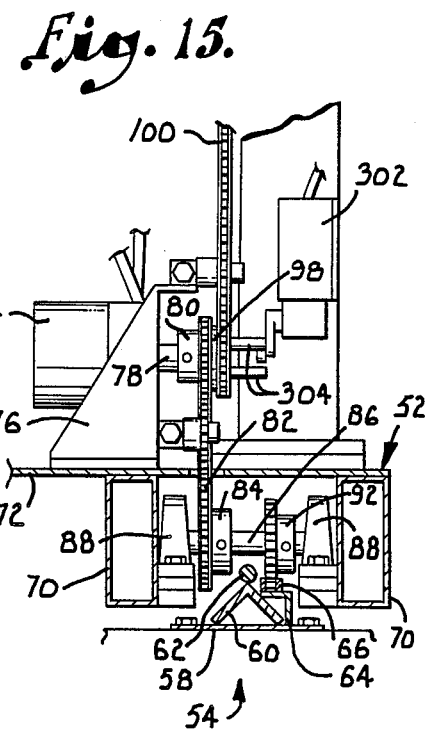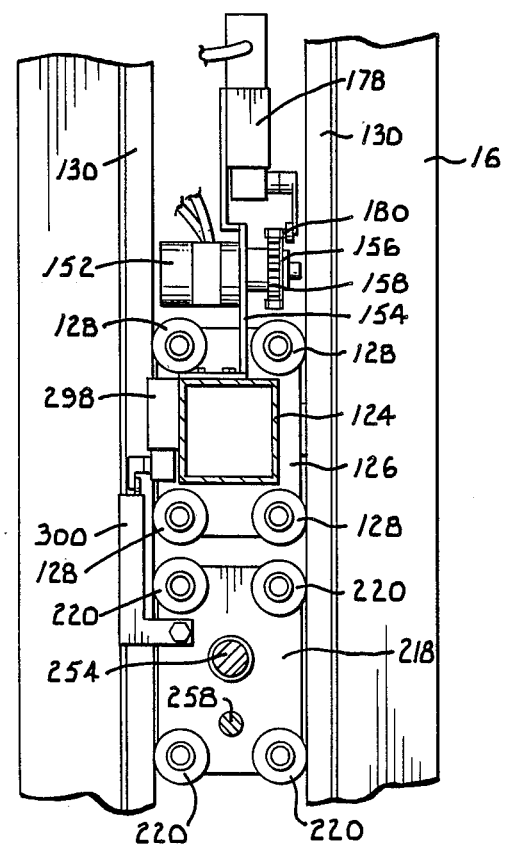

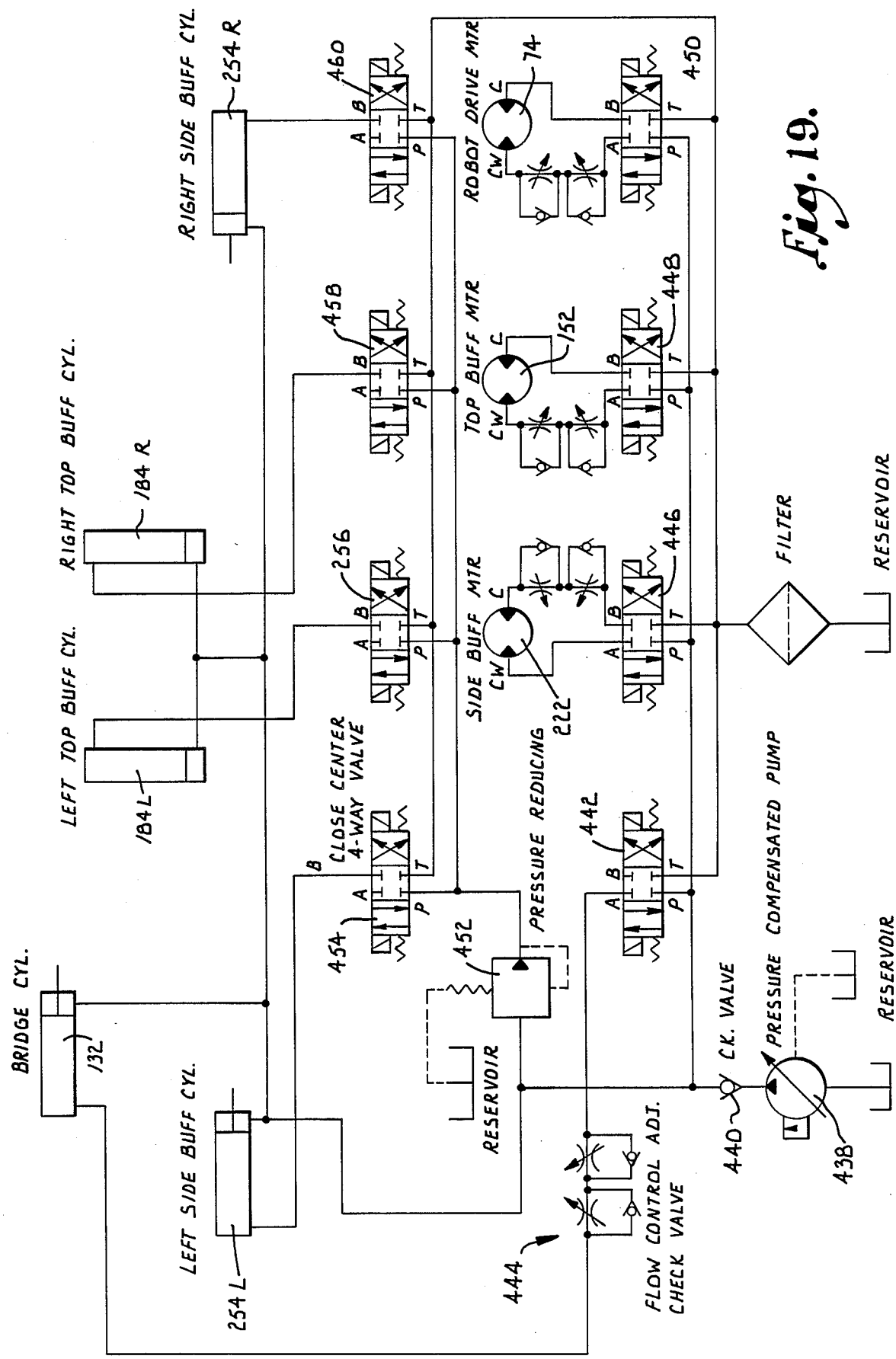

APPARATUS FOR BUFFING AND OTHERWISE TREATING VEHICLE BODIES

BACKGROUND AND SUMMARY OF THE INVENTION

This invention relates generally to the treatment of vehicle bodies and more particularly to a method and apparatus for waxing, buffing, sanding, painting, sandblasting, or otherwise treating a vehicle body.

Automobile cleaning centers and other facilities in which automobiles and other vehicles are cleaned and waxed are plagued by high labor costs. The waxing of vehicle bodies is a highly labor intensive process, even if power driven waxing and buffing equipment are used. Similarly, considerable labor costs are encountered in body shops and elsewhere when vehicle bodies are sanded. Other processes that are carried out in the treatment of vehicle bodies are also costly and labor intensive, including sandblasting, and painting. Similar problems are involved in treating other vehicles such as trucks, buses and boats.

The present invention is directed to an automated vehicle body treatment system that operates to buff, sand or otherwise treat vehicle bodies effectively and efficiently without the labor requirements that are associated with conventional treatment techniques. In accordance with the invention, a gantry type frame having the shape of an inverted U is mounted to move back and forth along linear tracks. An overhead bridge spans the two upright columns of the gantry frame and can move up and down on the columns within preselected limits. The bridge has two overhead carriages that can be driven in opposite directions toward and away from the center of the bridge. Each carriage is equipped with a hydraulic cylinder, and the cylinders in turn carry buffer heads each having four orbital buffing pads. The buffer heads can slide in and out on the cylinders within preselected limits.

Two additional carriages are mounted to move up and down in unison on the upright columns of the frame. Each of the side carriages is provided with a hydraulic cylinder, and each cylinder carries a side buffer head having four orbital buffing pads. The side buffer heads can slide in and out relative to the cylinders within preselected limits.

A control system is provided for controlling extension and retraction of the cylinders, movement of the carriages on the bridge and columns, activation of the buffers, and movement of the frame along the tracks. The control system is specially arranged to achieve efficient buffing of the top and both sides of a vehicle such as an automobile. Special features are incorporated in the control system to allow uneven surfaces to be buffed or otherwise treated with constant pressure. At the same time, measures are taken to avoid possible damage to the vehicle body.

DESCRIPTION OF THE DRAWINGS

In the accompanying drawings which form a part of the specification and are to be read in conjunction therewith and in which like reference numerals are used to indicate like parts in the various views:

FIG. 6 is a fragmentary rear elevational view on an enlarged scale of the overhead bridge and the top buffing mechanisms of the machine, with the two top cylinders fully retracted and the break lines indicating continuous length;

FIG. 7 is a fragmentary sectional view taken generally along line 7—7 of FIG. 6 in the direction of the arrows;

FIG. 10 is a fragmentary rear elevational view on an enlarged scale of the left side buffing mechanism, with the broken lines showing the fully retracted position of the hydraulic cylinder of the left buffing head;

FIG. 12 is a fragmentary sectional view on an enlarged scale taken generally along line 12—12 of FIG. 10 in the direction of the arrows;

FIG. 13 is a fragmentary elevational view on an enlarged scale taken generally along line 13—13 of FIG. 10 in the direction of the arrows;

FIG. 14 is a fragmentary elevational view on an enlarged scale taken generally along line 14—14 of FIG. 1b in the direction of the arrows;

FIG. 15 is a fragmentary sectional view taken generally along line 15—15 of FIG. 14 in the direction of the arrows;

FIG. 16 is a fragmentary sectional view on an enlarged scale taken generally along line 16—16 of FIG. 1b in the direction of the arrows and showing the right side buffer carriage and bridge carriage adjacent one another;

FIG. 17 is an electrical schematic of the control system for the top buffing mechanisms and bridge;

FIG. 19 is a schematic diagram of the hydraulic system of the machine.

DETAILED DESCRIPTION OF THE INVENTION

Figure 1A:
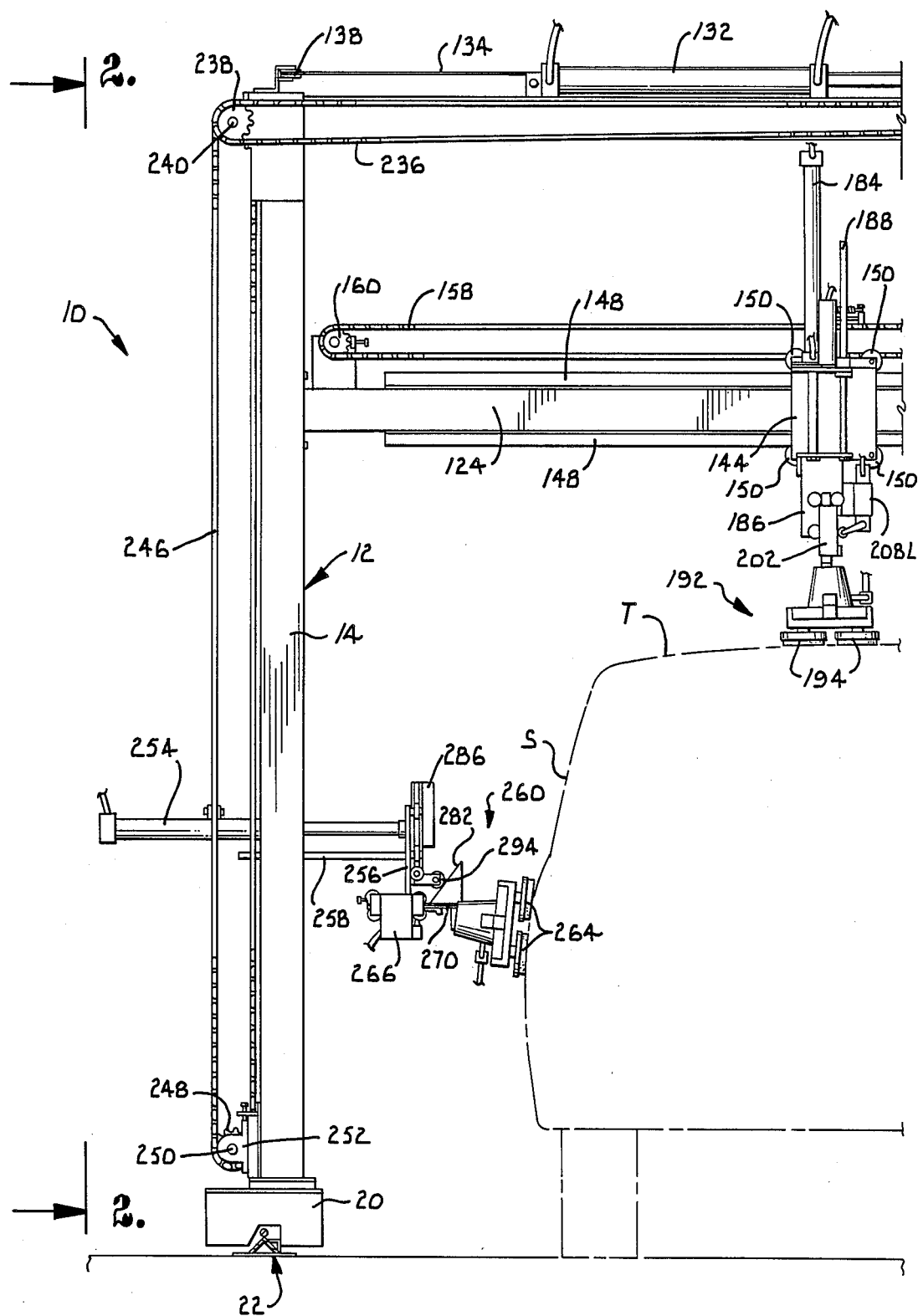
FIGS. 1a and 1b together are a rear elevational view of an automated car buffing machine constructed according to a preferred embodiment of the present invention, with all four buffer heads of the machine extended into contact with the top and sides of a vehicle body.
Figure 1B:
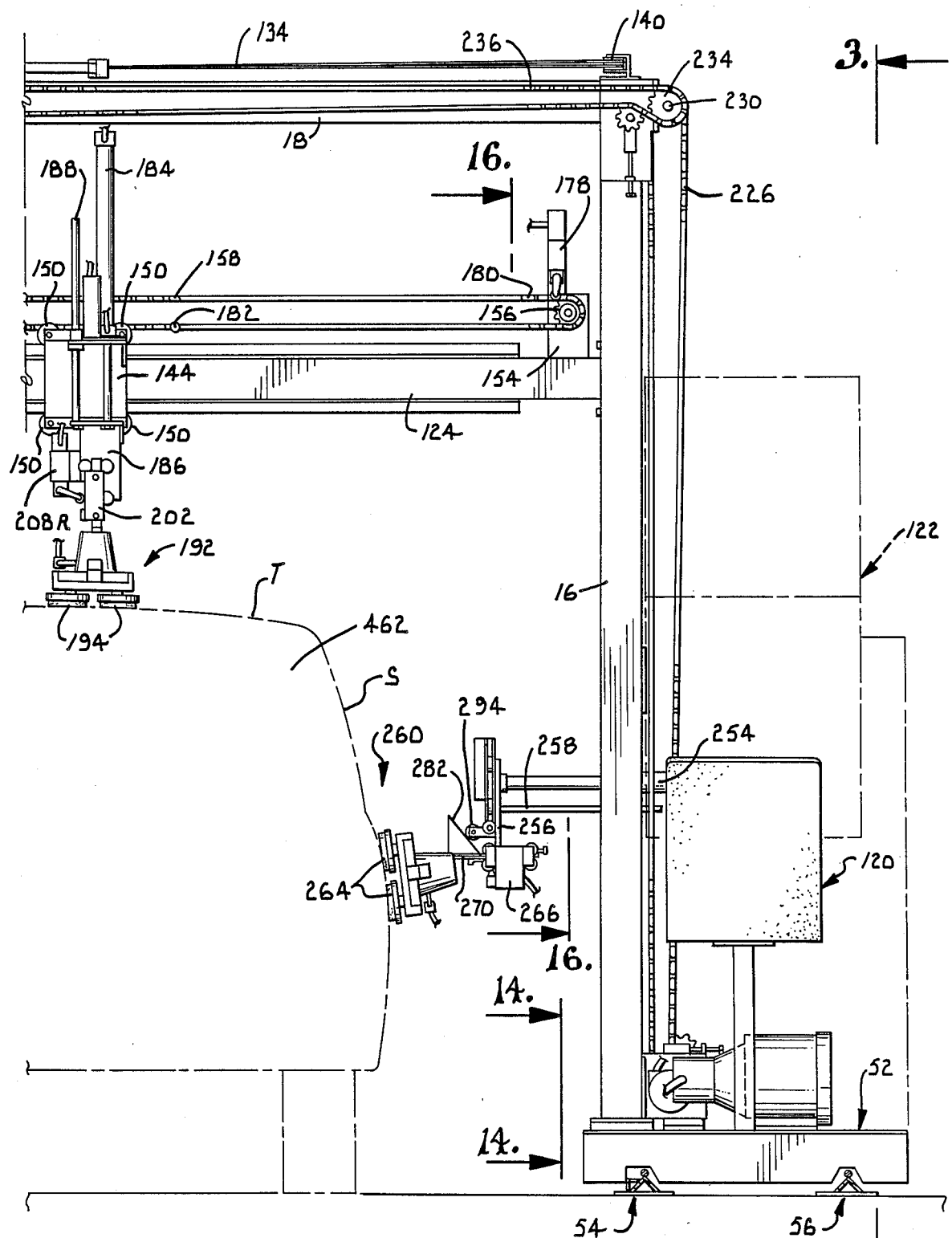

Referring now to the drawings in more detail and initially to FIGS. 1a and 1b, numeral 10 generally designates an automated vehicle buffing machine constructed in accordance with the present invention. The machine 10 includes a gantry type frame which is generally identified by reference numeral 12 and which has the shape of an inverted U. The frame 12 includes left and right upright columns 14 and 16 and an elevated crossbeam 18 which extends horizontally between the top ends of the columns 14 and 16.

Figure 4:
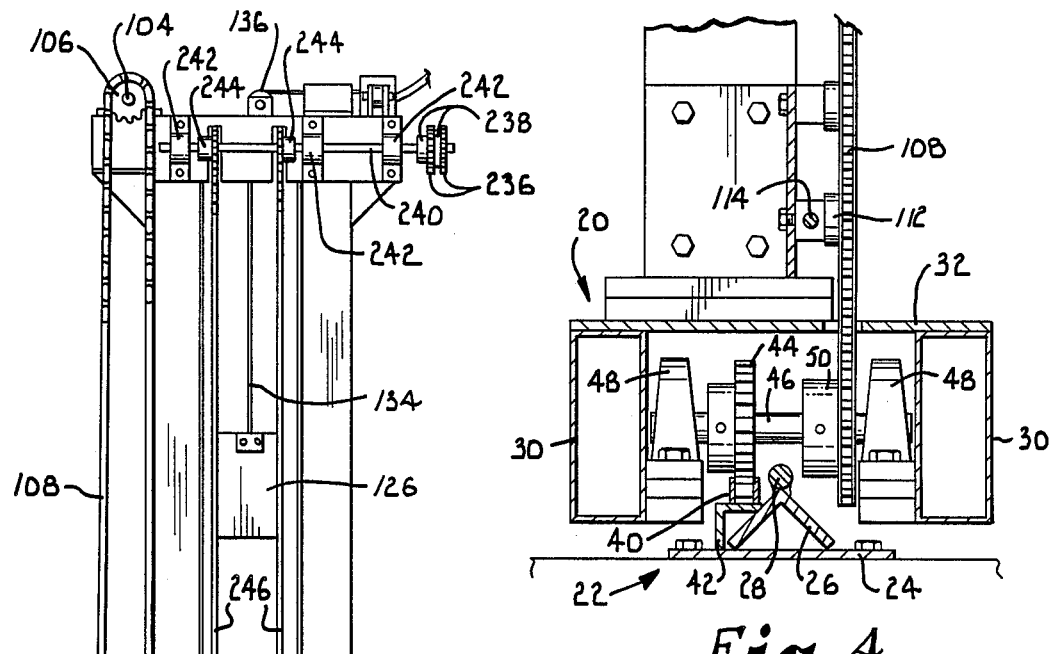
FIG. 4 is a fragmentary sectional view on an enlarged scale taken generally along line 4—4 of FIG. 2 in the direction of the arrows.
Figure 5:
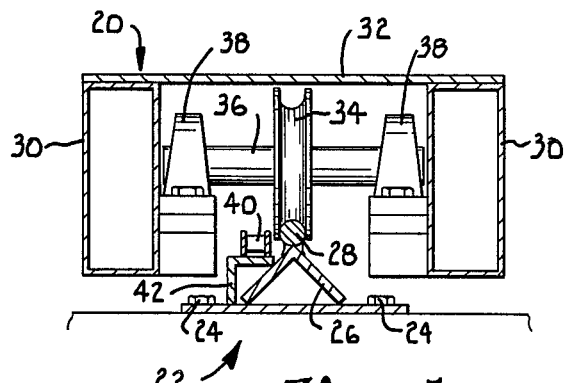
FIG. 5 is a fragmentary sectional view on an enlarged scale taken generally along line 5—5 of FIG. 2 in the direction of the arrows.

The left column 14 is mounted on a boxlike base 20 which travels along a rail 22. As best shown in FIGS. 4 and 5, rail 22 includes a base plate 24 which is bolted or otherwise secured to the floor. An angle member 26 is secured on top of plate 24 with the apex of the angle pointing upwardly. Secured to the apex of angle member 26 is a rigid rod 28. The base 20 includes a pair of side beams 30 and a top plate 32 connected to the beams 30. A pair of flanged wheels 34 are mounted near the front and back ends of base 20 on axles 36. Each axle 36 is supported for rotation by a pair of bearings 38 secured to the beams 30. The wheels 34 ride along the rod 28 in order to direct the base 20 back and forth along the track 22.

A chain 40 is mounted to extend alongside the rod 28. Chain 40 is secured on an angle member 42 which is in turn secured to plate 24 and to one of the flanges of angle member 26.

As shown in FIG. 4, a gear 44 mates with and travels along the chain 40 in order to drive base 20 along track 22. The gear 44 is mounted on an axle 46 supported for rotation by a pair of bearings 48 secured to the beams 30. Axle 46 also carries a sprocket 50 which is driven in a manner that will be described more fully.

The opposite or right column 16 is mounted on a boxlike base 52 which is somewhat larger than base 20. Base 52 moves along a pair of tracks 54 and 56 which are parallel to one another and to track 22. As shown in FIG. 15 in particular, track 54 includes a flat plate 58 bolted or otherwise secured to the floor and an angle member 60 mounted with its apex facing upwardly and provided with a rod 62. Track 56 has a similar construction. The inside track 54 is additionally provided with a toothed chain 66 mounted on an angle 64 located to one side of angle 60. Base 52 is provided with four flanged wheels 68, two near its front and two near its back, which ride on the rods 62 of tracks 54 and 56.

With continued reference to FIG. 15 in particular, base 52 includes a pair of box beams 70 and a horizontal plate 72 mounted on the box beams. The frame 12 is driven back and forth along the linear paths provided by the tracks 22, 54 and 56 by a hydraulic motor 74. The motor 74 is mounted on a bracket 76 which is in turn secured to the top of plate 72. Motor 74 has an output shaft 78 which carries a sprocket 80. A drive chain 82 is drawn around sprocket 80 and another sprocket 84 which is mounted within base 52 on a shaft 86. The shaft 86 is supported for rotation by a pair of bearings 88 secured to beams 70. Shaft 86 also carries a gear 92 which travels along the chain 66. The motor 74 thus drives gear 92 in order to move it along the chain 66, thus driving base 52 back and forth along the tracks 54 and 56. The tension of chain 82 is controlled by an idler sprocket 94 (FIG. 14) which may be adjusted by an adjustment screw 96.

The motive power provided by the motor 74 is transmitted to gear 92 and also to the drive gear 44 for the base 20 of the left column 14. The transmission system includes a second sprocket 98 (FIG. 15) mounted on the motor output shaft 78. A chain 100 is drawn around sprocket 98 and around another sprocket 102 (see FIG. 3) mounted on the cross beam 18 of the frame. Sprocket 102 drives a horizontal shaft 104 which extends along beam 18 and drives another sprocket 106 located on the opposite side of the frame (see FIG. 2). A chain 108 is drawn around sprocket 106 and also around the sprocket 50 located within base 20. An idler sprocket 110 engages chain 108. The tension of chain 108 is controlled by another idler sprocket 112 which may be adjusted by an adjustment screw 114. Chain 100 similarly has its tension controlled by an idler sprocket 116 (see FIG. 3) which may be adjusted by an adjustment screw 118.

In this manner, the motive force supplied by motor 74 is transmitted to the two drive gears 44 and 92, and these gears in turn mate with the racks 40 and 66 to drive the frame 12 along the tracks 22, 54 and 56. It is noted that motor 74 may be driven in opposite directions to move the frame 12 in both forward and return directions of travel.

Figure 3:
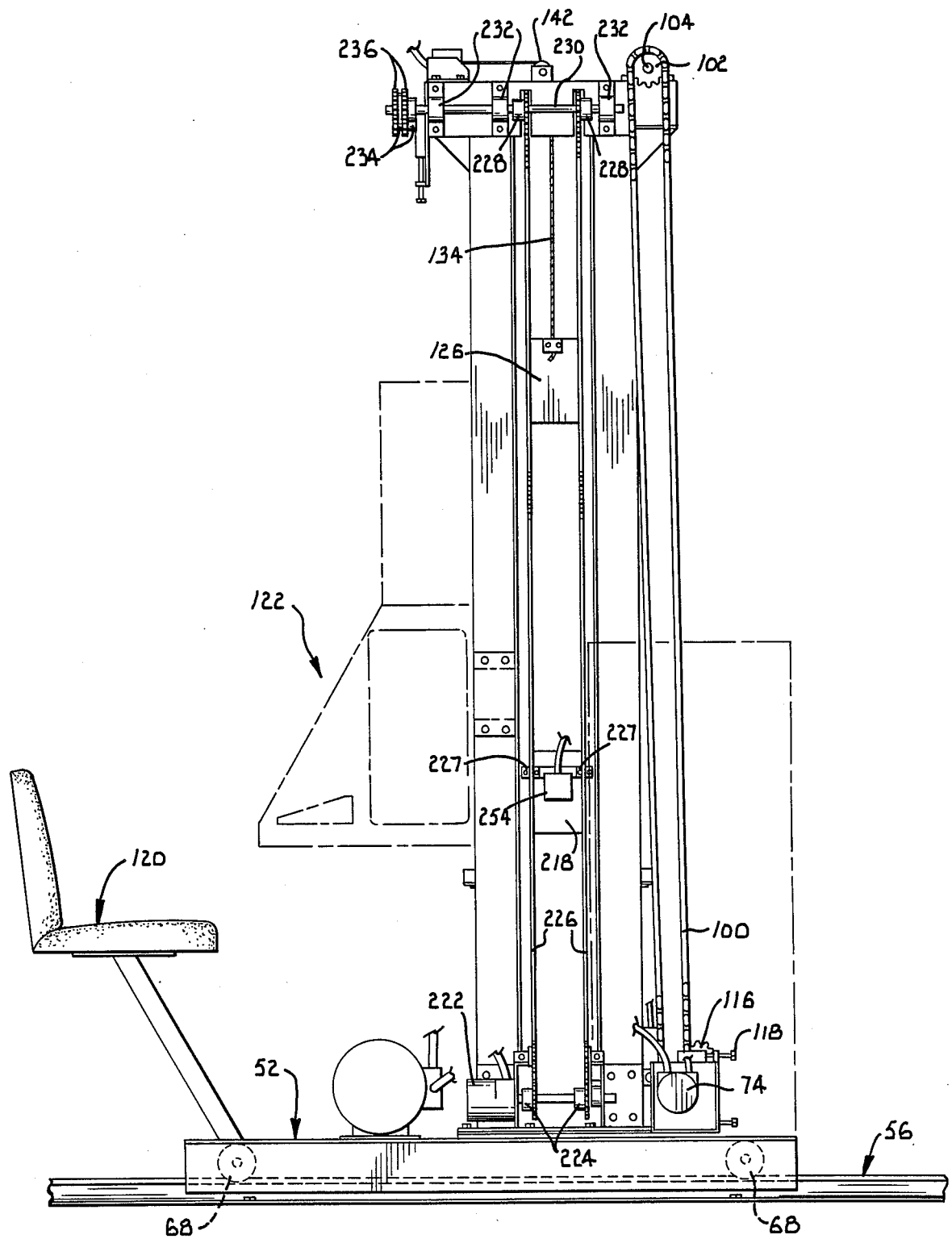
FIG. 3 is a side elevational view taken generally along line 3—3 of FIG. 1b in the direction of the arrows.

As best shown in FIGS. 1b and 3, an operator's chair 120 is mounted on base 52. A control console 122 is mounted in front of the operator's chair 120 at a convenience height. The control console 122 contains the various system controls that are operated by the operator stationed on chair 120.

A horizontal bridge 124 extends at an overhead position between the columns 14 and 16 and is mounted to move upwardly and downwardly on the columns. Bridge 124 takes the form of a square beam. The opposite ends of the bridge 124 are secured to carriages 126 (see FIG. 16) in particular each having a plurality of wheels 128 that ride against vertical tracks 130 provided on the columns 14 and 16.

Figure 2:
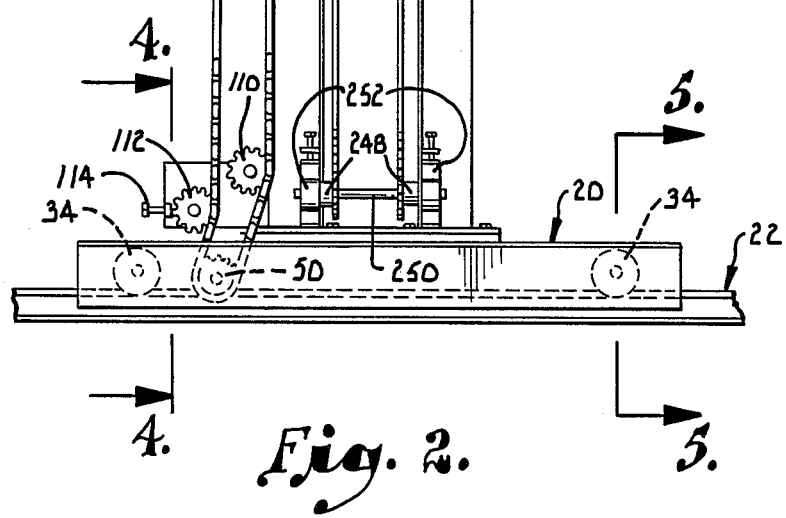
FIG. 2 is a side elevational view taken generally along line 2—2 of FIG. 1a in the direction of the arrows.

Up and down movement of the bridge 124 is controlled by a hydraulic cylinder 132 which is best shown in FIGS. 1a and 1b. Cylinder 132 is mounted on top of the crossbeam 18 and controls a flexible cable 134. One end of cable 134 is secured to the carriage 126 on the left column, as shown in FIG. 2. The cable 134 extends upwardly and is drawn around a pulley 136 mounted on the crossbeam at the top of column 14. The cable is then drawn around another pulley 138 (see FIG. 1a) and passed along beam 18 and around another pulley 140 mounted at the top of the opposite column 16. The cable is secured to the rod end of cylinder 132 and is passed around another pulley 142 (see FIG. 3). The end of the cable is secured to the carriage 126 on the right column 16. When the rod of cylinder 132 is extended, the two carriages 126 move downwardly by equal amounts along columns 14 and 16 due to the arrangement of the cable 134. Conversely, when the cylinder rod is retracted, the two carriages 126 are pulled upwardly along columns 14 and 16 by equal amounts. Thus, cylinder 132 moves the bridge 124 up and down while maintaining it in a horizontal orientation at all times.

A pair of overhead carriages 144 are mounted on the bridge 124. As best shown in FIG. 7, each carriage 144 is bent generally around the bridge 124 and includes rotatable wheels 146 which fit between top and bottom tracks 148 mounted on the bridge 124. The wheels 146 maintain carriages 144 on the bridge. Additional wheels 150 are located on the top and bottom ends of each carriage and roll along tracks 148 to accommodate movement of the carriages along the bridge.

The carriages 144 move on bridge 124 from its center outwardly toward its opposite ends and from the opposite ends of the bridge inwardly toward its center. A hydraulic motor 152 (see FIG. 16) drives the carriages 144 in and out along the bridge. Motor 152 is mounted on a bracket 154 secured to bridge 124. The output shaft of motor 152 carries a sprocket 156 around which a chain 158 is drawn. Chain 158 is also drawn around a sprocket 160 (see FIG. 6) secured to a bracket 162 mounted on the opposite end of bridge 124. An adjustment screw 164 acts on sprocket 160 to control the tension of chain 158.

Figure 9:
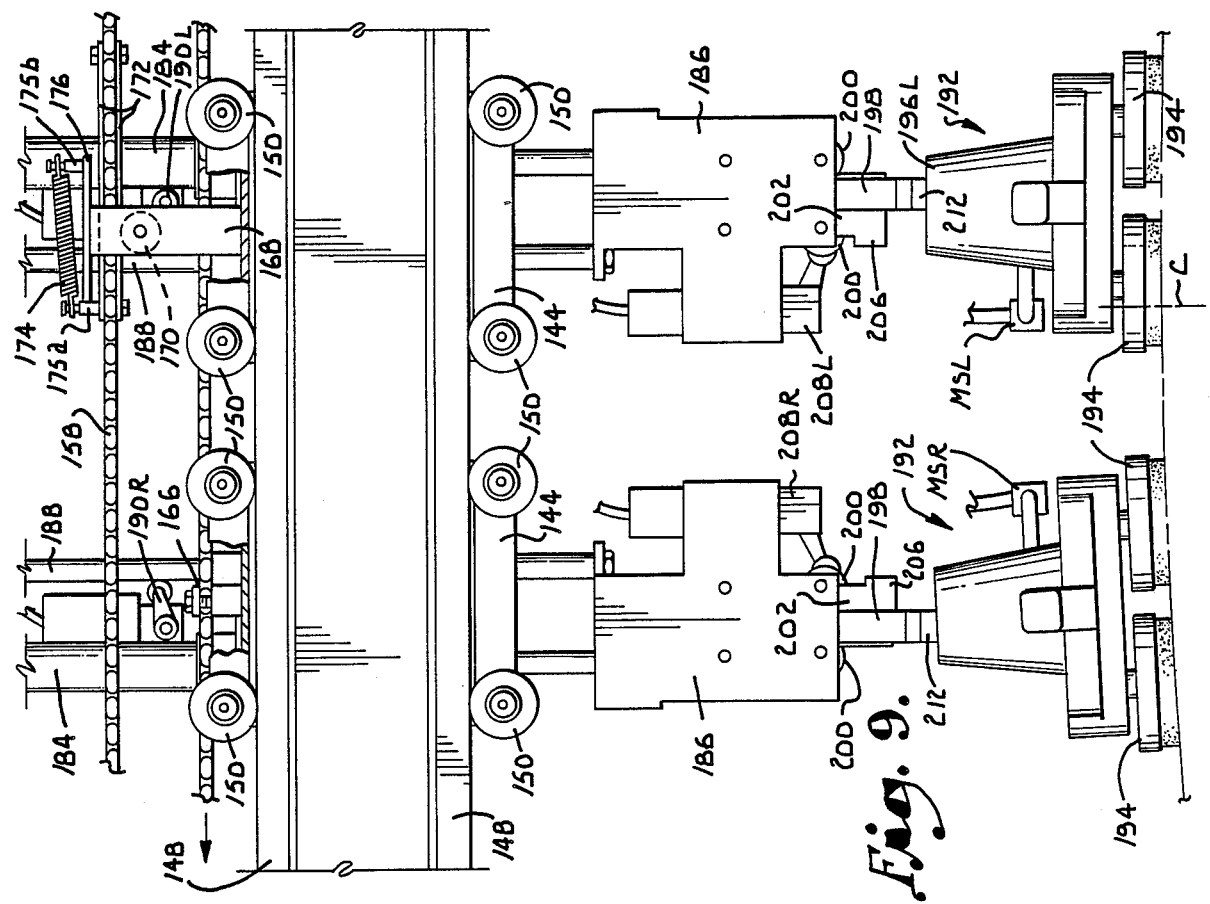
FIG. 9 is a fragmentary front elevational view similar to FIG. 8 but showing the positions of the top buffing heads immediately after they have been activated to begin traveling outwardly along the bridge, with portions broken away for purposes of illustration.
Figure 8:
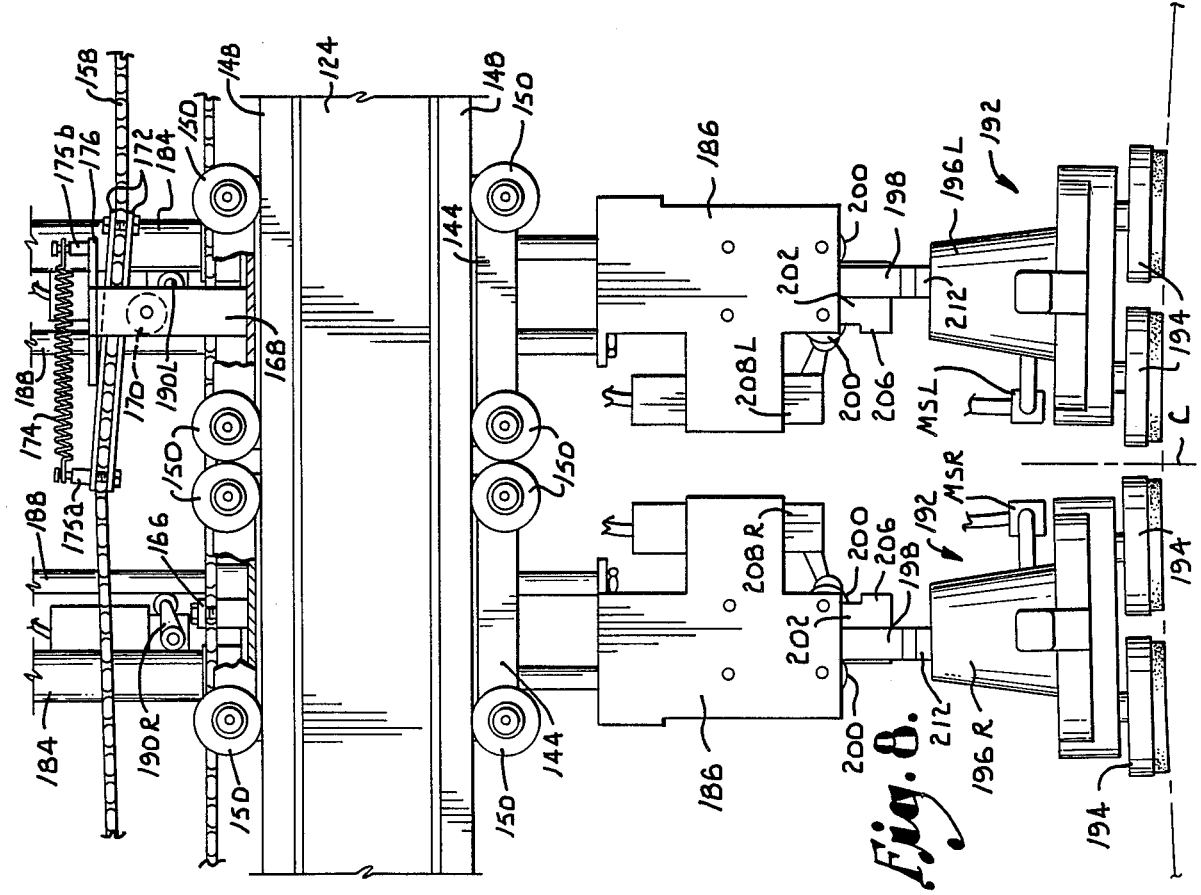
FIG. 8 is a fragmentary front elevational view of the center portion of the bridge and the top buffing mechanisms, with the top cylinders extended and portions broken away for purposes of illustration.
Figure 11:
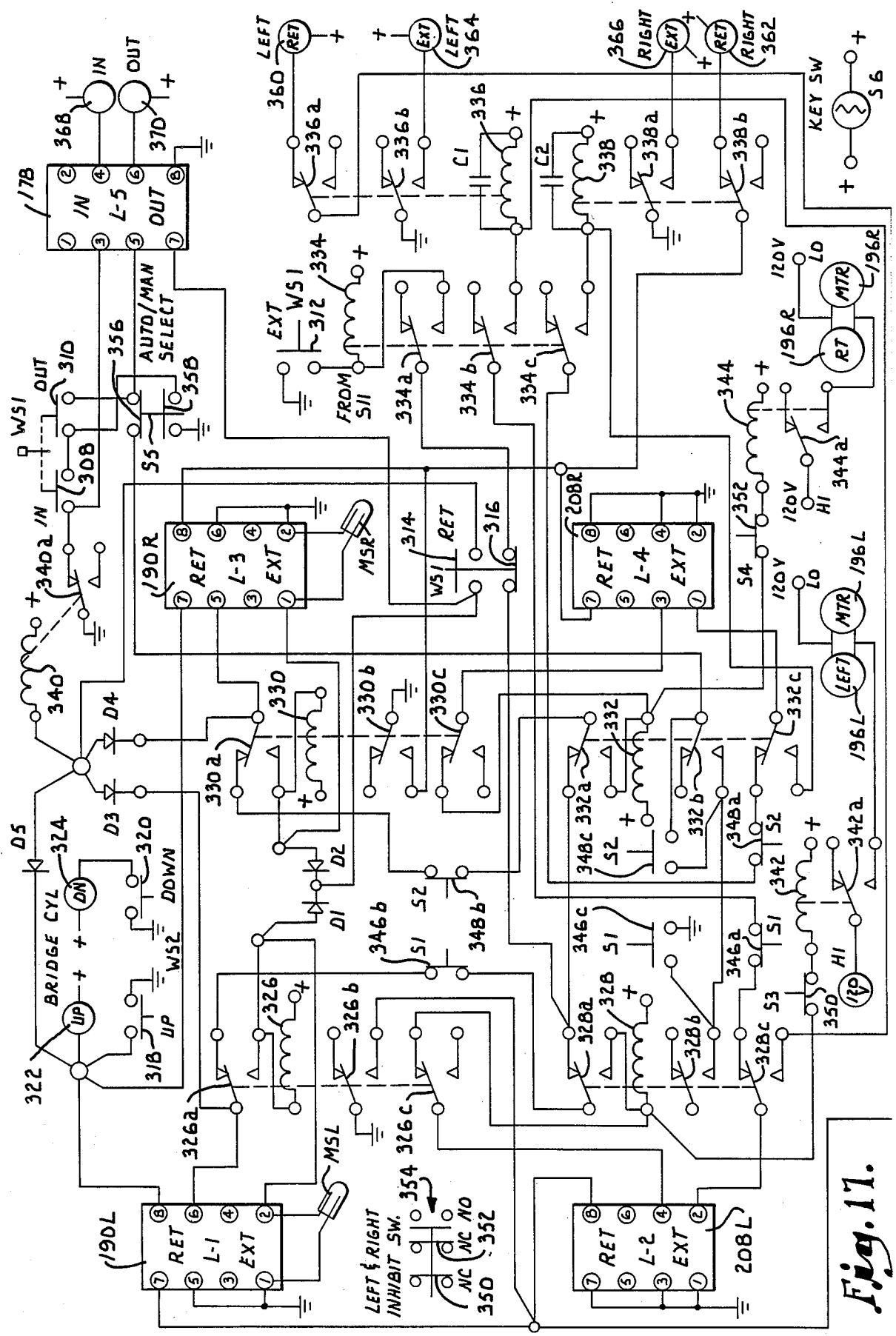
FIG. 11 is a fragmentary end elevational view of the left buffing mechanism taken generally along line 11—11 of FIG. 10 in the direction of the arrows.

As best shown in FIGS. 8 and 9, one of the carriages 144 is clamped at 166 to the bottom run of chain 158. The other carriage 144 has a bracket 168 extending upwardly from it. Bracket 168 carries a wheel 170 on which a pair of plates 172 rock between the positions shown in FIGS. 8 and 9. The plates 172 are clamped to the top run of chain 158. A tension spring 174 is hooked at one end to the plates 172 the opposite end of spring 174 is hooked to a peg 175b extending from a plate 176 secured to the top of bracket 168.

Due to the direct connection of one carriage 144 to the lower run of chain 158, that carriage moves back and forth directly with the lower run of the chain. The spring connection of the other carriage to the top run of the chain causes the other carriage to be pulled inwardly toward the center of bridge 124 when the top run of the chain moves in one direction. When the top run of the chain moves in the other direction, peg 175a bears against the edge of plate 176 as shown in FIG. 9 and thus moves the carriage along with the top run of the chain. It is noted that when the two carriages 144 are moved together at the center of bridge 124 in the position of FIG. 8, spring 174 is placed under tension and thus urges the right carriage 144 coupled with the upper run of the chain to the right (as viewed in FIGS. 8 and 9). Consequently, when the motor 152 is activated to initially move the carriages 144 outwardly along beam 124, the carriage connected with the bottom run of the chain moves to the left (as viewed in FIGS. 8 and 9) and the other carriage initially moves a short distance to the left as well, due to the tension force applied by spring 174. This initial movement to the left brings the carriage 144 which is coupled with the upper run of the chain 158 to a position to the left of the center of the bridge, as shown in FIG. 9. Consequently, an overlap is effected between the two top buffing heads so that there is no gap at the center which is missed by the buffing heads. Once the top run of chain 158 has moved far enough to the right (as viewed in FIGS. 8 and 9) to relieve the tension of spring 174, both carriages 144 thereafter travel outwardly along beam 124 away from one another.

As best shown in FIGS. 6 and 16, a limit switch 178 is mounted on bracket 154. A pair of pegs 180 and 182 project from chain 158. Peg 180 is located such that it trips the actuating arm of switch 178 in one direction when the carriages 144 have moved together at the center of bridge 124. Peg 182 is located such that it trips the actuator arm of switch 178 in the opposite direction when the carriages 144 have reached their outer limit of travel along bridge 124.

A hydraulic cylinder 184 is mounted on each carriage 144. The rod end of each cylinder 184 is connected with a bracket plate 186 which is lowered away from carriage 144 when the cylinder is extended and raised upwardly toward the carriage when the cylinder is retracted. A guide rod 188 connects with each bracket 186 in order to guide it upwardly and downwardly and prevent skewing of the bracket. Each cylinder 184 is equipped with a limit switch which is tripped in one direction when the cylinder is fully extended and in the opposite direction when the cylinder is fully retracted. The limit switch for the cylinder 184 for the left carriage 144 (as viewed from the rear) is identified by numeral 190L, while the limit switch for the other cylinder is identified by numeral 190R.

Each bracket 186 is equipped with a buffing head 192. The buffing heads 192 serve to buff the tops of vehicle bodies, and each buffer head 192 includes four buffing pads 194. The pads 194 are arranged in pairs, with the pads 194 in each pair being driven by an electric motor. The motors for the pads on the left buffing head are designated by numeral 196L, while the motors for the pads on the right buffing head are designated by numeral 196R. Each pad 194 is driven eccentrically in an orbital path when its drive motor is activated.

Each buffer head 192 is carried on the lower end of a vertical track 198 that can slide upwardly and downwardly between sets of rollers 200 mounted on bracket 186. The buffing heads thus extend and retract with respect to the brackets 186 between limiting positions. Each track 198 carries a bar 202 having upper and lower fingers 204 and 206 projecting from it. The extension limit for each buffing head 192 is established when the top finger 204 trips the actuator of a limit switch in one direction. The upward or retracted limit of each buffing head 192 is established when the lower finger 206 trips the actuator of the limit switch.

The limit switch for the left buffing head is identified by numeral 208L, while the limit switch for the right buffing head is identified by numeral 208R. The weight of each buffing head urges it toward the fully extended position under the influence of gravity.

Extending from the bottom end of each track 198 is a horizontal arm 210 which is in turn connected with a vertical arm 212. The buffing heads 192 have universal joint connections with the arms 212. Referring particularly to FIG. 7, each buffing head 196 can tilt about two mutually perpendicular pins 214 and 216 with each having a horizontal orientation. The left buffing head 192 has a mercury switch MSL which is activated when the head tilts about a pin 216 to the position shown in FIG. 6. The right buffing head 192 similarly has a mercury switch MSR which is activated when the right buffing head is fully tilted to the position shown in FIG. 6.

The buffing pads 194 are driven eccentrically in orbital paths in order to provide good buffing action. The buffing heads 192 are normally maintained against the top of the vehicle body by the force of their weight. In order to increase or decrease the force applied to the vehicle body top, weights (not shown) may be bolted to or removed from the bars 202.

Each column 14 and 16 of the frame is provided with a wheeled carriage 218 which is mounted to roll up and down on the column below the carriage 126 for the bridge 124. As best shown in FIG. 10, each side carriage 218 is provided with a plurality of wheels 220 which ride on the tracks 130 of the column.

The side carriages 218 are driven up and down by a hydraulic motor 222 (see FIG. 3). The output shaft of motor 222 carries a pair of sprockets 224 which drive chains 226 secured at 227 to the carriage 218 on the right column 16. The top ends of chains 226 are drawn around sprockets 228 which are mounted on a shaft 230. The shaft 230 is located at the top portion of the frame and is supported for rotation by bearings 232. One end of sprocket 230 carries a pair of sprockets 234 which drive chains 236. Chains 236 extend along the length of beam 18 and drive sprockets 238 mounted near the top end of the left column 14, as shown in FIG. 2. Sprockets 238 are mounted on a shaft 240 which is supported to rotate by bearings 242. Also mounted on shaft 240 are a pair of sprockets 244 around which chains 246 are drawn. Chains 246 are also drawn around sprockets 248 mounted on a shaft 250 located slightly above base 220. Shaft 250 is supported to rotate by bearings 252. The carriage 218 on the left column 14 is secured at 253 to the chains 246.

By virtue of the drive system which moves the carriages 218 up and down on columns 14 and 16, the two carriages 218 are moved in unison and both move in the same direction and through the same distance whenever the drive motor 222 is activated. Each carriage 218 has a limit switch which is tripped in one direction when the carriage is at the lower limit of its travel and in the opposite direction when the carriage is at its upper limit of travel.

Each carriage 218 is equipped with a hydraulic cylinder 254. As best shown in FIG. 10, the rod end of each cylinder 254 is connected with a vertical bracket plate 256. Consequently, the bracket plate 256 is extended inwardly away from carriage 218 when the cylinder is extended and is drawn outwardly toward the carriage when the cylinder is retracted. A guide rod 258 connects at one end with the bracket plate 256 to provide guiding action as the bracket plate is moved inwardly and outwardly. Each cylinder 254 is equipped with a limit switch which is tripped in one direction when the cylinder is fully extended and in the opposite direction when the cylinder is fully retracted.

Each bracket plate 256 carries a buffing head generally identified by numeral 260. Each side buffing head 260 includes a pair of electric motors 262 which drive four buffing pads 264. The buffing pads 264 are driven in eccentric or orbital paths to provide orbital buffing action against the side of the vehicle body.

A pair of parallel plates 266 are mounted on the bottom end of each bracket 256. The plates 25 support a plurality of rollers 268 which receive a sliding horizontal platform 270 between them. The buffing head 260 is connected with the platform 270 through a universal joint connection which includes a vertical pin 272 and a horizontal pin 274 (see FIG. 12). The buffing head can move from side to side about pin 272 and can pivot up and down about pin 274, thereby accommodating irregularities in the surface which is being buffed.

Platform 270 carries the buffing head 260 and can slide in and out on the rollers 268 between limiting positions established by a pair of spaced apart trip fingers 276 (FIG. 10) and 278 (FIG. 13) projecting below the platform. When the buffing head 260 is fully extended, the trailing finger 278 trips the actuator arm of a limit switch in one direction. The actuator of the limit switch is tripped in the opposite direction by finger 276 when the buffing head is fully retracted. The limit switch for the buffing head on the left side is identified by numeral 280L, while the limit switch for the right side buffing head is identified by numeral 280R.

Each buffing head 260 is continuously urged toward its fully extended position by a weighted roller and ramp arrangement. An inclined ramp surface 282 is provided on a ramp 284 mounted on top of platform 270. A weighted roller assembly includes a weight 286 which is bolted or otherwise secured to a vertical track 288. The bracket plate 256 is provided with a plurality of wheels 290 that fit in track 288 to accommodate up and down movement of the track. The bottom end of track 288 carries a pair of rollers 292 that roll up and down on the bracket plate 256. Another roller 294 is mounted on track 288 at a location to ride up and down on the inclined ramp surface 282.

The weight 286 continuously urges track 290 downwardly, and the engagement of roller 294 against ramp surface 282 biases platform 270 outwardly. However, platform 270 can retract inwardly such that the roller 294 moves upwardly along the ramp surface 282 within the limits allowed for the extension and retraction of the buffing head, as established by the trip fingers 276 and 278.

Additional weights may be added onto or removed from the weighted roller assembly in order to increase or decrease the force with which the buffing head is urged toward the fully extended position.

Extension and retraction of each side cylinder is limited by a limit switch 296 (FIG. 10) which is tripped when the limiting position of the cylinders are reached. Upward travel of each side carriage 218 is limited by another limit switch 298 (see FIG. 16) which is carried on the bridge 124. When the limiting position of carriage 218 is reached, a trip arm 300 mounted on the carriage trips the limit switch 298.

Movement of the frame 12 along the tracks 22, 54 and 56 is controlled by a limit switch 302 which is illustrated in FIGS. 14 and 15. Sprocket 98 has a pair of diametrically opposed pegs 304 which project from it at locations to trip the actuator of limit switch 302. Each time sprocket 98 is rotated through one-half revolution, one of the pegs 304 trips the limit switch 302. It is noted that the actuator of limit switch 302 is tripped in opposite directions when the machine is moving in the forward and return directions.

Figure 18:
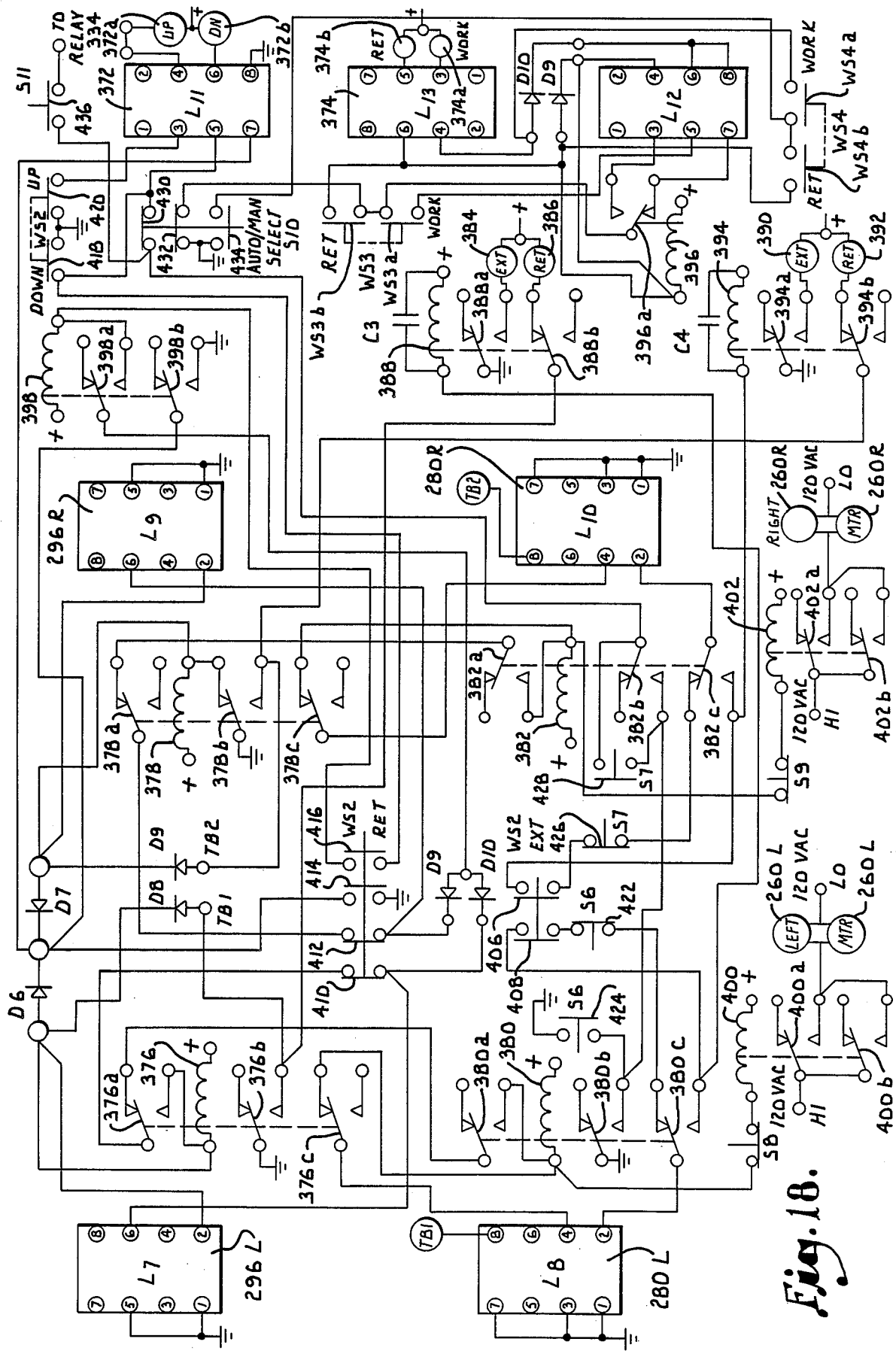
FIG. 18 is an electrical schematic of the control system for the side buffing mechanisms and the drive system for the frame.

The machine 10 has an electrical control system which is shown in FIGS. 17 and 18. Referring first to FIG. 17, the control system for the top buffing heads 192 and the bridge 124 includes the limit switches 190L, 190R for the left and right cylinders 184, the limit switches 208L and 208R for the left and right buffing heads 192 and the in-out travel limit switch 178 for the top buffing heads. Each limit switch includes 8 contacts which are connected and disconnected in accordance with the condition of the limit switch. Contacts 1 and 2 of each limit switch are closed only when the corresponding component is fully extended and are otherwise open. Contacts 3 and 4 of each limit switch are open only when the corresponding component is fully extended and are otherwise closed. Contacts 5 and 6 of each limit switch are open only when the corresponding component is fully retracted and are otherwise closed. Finally, contacts 7 and 8 of each limit switch are closed only when the corresponding component is fully retracted and are otherwise open.

The controls include a wobble stick WS1 which controls the in and out travel of the top buffing heads through respective contacts 308 and 310. The wobble stick WS1 also includes an extend contact 312 and two retract contacts 314 and 316. Another wobble stick WS2 controls up and down movement of the bridge 124 through contacts 318 and 320, respectively. The contacts 318 and 320 control the condition of respective solenoids 322 and 324. When solenoid 322 is energized, the bridge control cylinder 132 retracts and thus raises the bridge 124. Conversely, energization of solenoid 324 causes the bridge cylinder to extend and thus lower the bridge.

The control system includes a number of relays, including a relay coil 326 which controls three sets of contacts 326a, 326b and 326c. Another relay coil 328 controls contacts 328a, 328b and 328c. Relays 326 and 328 function to retract the left and right cylinders 184.

Commencement and continuation of the buffing action of the top buffers is controlled by relay coils 330 and 332. Relay 330 controls contacts 330a, 330b and 330c. The other relay 332 controls contacts 332a, 332b and 332c. The system is locked in the automatic mode of operation by a relay coil 334 which controls contacts 334a, 334b and 334c. Relay coils 336 and 338 are time delay relays for control of the extension of the cylinders. Coil 336 controls relay contacts 336a and 336b, while coil 338 controls contacts 338a and 338b. A capacitor C1 is arranged in parallel in with coil 336. Another capacitor C2 is arranged in parallel with the other coil 338.

The in travel of the top carriages 144 is controlled by another relay 340 having contacts 340a. Relay 342 controls contact 342a which activates the left buffer motors 196L when transferred. Another relay 344 controls contact 344a which transfers when the coil is energized and then activate the right buffing head motors 196R. All of the relay contacts are shown in the drawings in the conditions they assume when the relay coils are deenergized.

Switches included in the control system include a left top buffer kill switch S1 having a pair of normally closed contacts 346a and 346b and a normally open contact 346c. Switch S2 is used as a kill switch for the right top buffer and includes a pair of normally closed contacts 348a and 348b and a normally open contact 348c. The motor 196L can be disabled by opening a normally closed switch 350. Similarly, the buffer motors 196R can be disabled by opening a normally closed switch 352 which is in series with the relay 344. An inhibit switch 354 can be activated to simultaneously open both of the switches contacts 350 and 352.

Switch S5 is a select switch for the automatic or manual mode of operation and includes two sets of contacts 356 and 358. Switch S5 is shown in the automatic position. When set in the manual position, contact 356 is open and the other contact 358 is closed.

Cylinders 184 are controlled by solenoids, including the solenoid 360 which retracts the left cylinder 184 when energized. The right cylinder 184 is retracted when the right retract solenoid 362 is energized. Extension of the left cylinder is effected by energizing solenoid 364. Solenoid 366 can be energized to extend the right cylinder 184. Additional in and out solenoids 368 and 370 control the in and out travel of the overhead carriages 144. When solenoid 368 is energized, the carriages 144 and the buffing heads they carry are driven inwardly toward one another along the bridge 124. Conversely, carriages 144 are moved outwardly away from one another when solenoid 370 is energized.

A key switch S6 must be activated with a key before power can be applied to the machine.

FIG. 18 depicts the control circuitry for the side buffing heads 260 and the drive system which propels the frame along the tracks 22, 54 and 56. The control circuitry shown in FIG. 18 includes the limit switches 296L and 296R for the left and right cylinders 254. Also included are the limit switches 280L and 280R for the left and right buffing heads 260. Limit switch 302 is also included in the circuitry. Limit switch 372 limmits the up and down travel of the side carriages 218. Another limit switch 374 is tripped when the machine reaches limiting positions at opposite ends of the tracks 22, 54 and 56.

A relay coil 376 controls three sets of contacts 376a, 376b and 376c. Another relay 378 similarly controls three sets of contacts 378a, 378b and 378c. Relays 380 and 382 likewise control contacts 380a, 380b and 380c and 382a, 382b and 382c. The extend solenoid 384 and the retract solenoid 386 for the left hydraulic cylinder 254 are controlled by a relay 388 having two sets of contacts 388a and 388b. A capacitor C3 is arranged in parallel with relay coil 388. The extend solenoid 390 and retract solenoid 392 are similarly controlled by a relay 394 having two sets of contacts 394a and 394b. Arranged in parallel with coil 394 is a capacitor C4. Relay 396 has the relay contact 396a. Another relay 398 has two sets of contacts 398a and 398b. The left buffer motors 260L are controlled by a relay 400 having contacts 400a and 400b which transfer to complete the circuit through the motors 260L. The right side buffer motors 260R are controlled by another relay 402 having contacts 402a and 402b.

The WS2 extend wobble stick includes two normally open contacts 406 and 408. The WS2 retract wobble stick includes four sets of contacts, contacts 410 and 412 being normally closed and contacts 414 and 416 being normally open. Manual up and down control of the side buffer heads is effected by a wobble switch WS5 having a down contact 418 and an up contact 420.

Switch S6 is a kill switch for the left side buffing system and includes two sets of contacts 422 and 424. A kill switch S7 for the right side buffing system includes two sets of contacts 426 and 428. Contacts 422 and 426 are normally closed, while contacts 424 and 428 are normally open. Switch S8 is in series with relay coil 400 and can be opened to disable the left buffing motors 260L. Switch S9 is also normally closed and can be opened to deactivate coil 402 and disable the right side buffer motors 260R.

Switch S10 is a selector switch for the automatic or manual selection. Contacts 430 and 432 are closed and contact 434 is open in the automatic setting of switch S10. When switch S10 is in the manual position, contacts 430 and 432 are open and contact 434 is closed. A normally open S11 switch 436 is a special feature switch which enables the operator to extend the top buffers only when the side buffers have received an automatic down movement command.

Wobble switch WS3 is used to control movement of the machine in the forward and return directions in the automatic operating mode. The two contacts of switch WS3 include the work contact WS3a for moving the machine forward and the return contact WS3b for moving the machine in the opposite direction. Wobble switch WS4 controls the machine movement in the manual mode of operation and includes a work contact WS4a and a return contact WS4b. Up and down solenoids 372a and 372b are controlled through limit switch 372 to move the side carriages 218 up and down.

FIG. 19 is a schematic diagram of the hydraulic system of the machine. A pressure compensated pump 438 connects through a check valve 440 with the solenoid operated valves that control the various cylinders and hydraulic motors. Valve 442 controls the bridge cylinder 132 through an adjustable flow control check valve 444. Solenoid operated valve 446 controls motor 222 which moves the side buffers up and down. Valve 448 controls the motor 152 which drives the top buffers in and out. Valve 450 controls the drive motor 74 which propels the machine along the tracks 22, 54, and 56. The pump 438 supplies fluid through a pressure reducing valve 452 to additional solenoid operated valves 454, 456, 458 and 460. Valve 454 controls the left side cylinder 254L. Valve 460 controls the opposite or right side cylinder 254R. Valve 452 controls the top left cylinder 184L, while valve 458 controls the right top cylinder 184R.

OPERATION

In operation of the machine, a vehicle such as the automobile indicated by numeral 462 in FIGS. 1a and 1b is driven between the tracks 22 and 54 until its body is approximately centered between the two columns 14 and 16. Preferably, the columns 14 and 16 are initially located near the back end of the vehicle body so that buffing of the automobile body can be carried out from back to front. However, the vehicle body can be buffed from front to back as well.

Referring to FIG. 17, the key switch S6 must be switched on with a key, and the operator then momentarily closes the WS1 extend switch 312. Relay coil 334 is momentarily energized and is thereafter maintained in the energized state by a holding circuit that includes contact 334a, the WS1 retract contact 316, contact 328a, switch 346b, contact 326a and the closed contacts 5 and 6 of limit switch 190L. A second holding circuit is also established through coil 334 along the path defined by contact 334a, wobble switch contact 316, contact 332a, switch 348b, contact 330a and the closed contacts 5 and 6 of limit switch 190R. So long as either one of these holding circuits remains completed, relay coil 334 remains energized to lock the system in the automatic extension mode.

With relay coil 334 energized, coil 336 is also energized through contact 334b, switch 346a, contact 328c and the closed contacts 1 and 2 of limit switch 208L. Relay coil 338 is likewise energized through contact 334c, switch 348a, contact 332c and the closed contacts 1 and 2 of limit switch 208R. Coils 336 and 338 are thus energized to transfer contacts 336a and 336b and contacts 338a and 338b, thus disabling the retract solenoids 360 and 362 and energizing the extend solenoids 364 and 366. Energization of solenoids 364 and 366 causes the left and right cylinders 184 to extend.

It is noted that the weight of the top buffing heads 192 normally maintains them in the fully extended positions relative to the carriages 144. If the cylinders 184 are fully extended and the buffer heads 192 do not come into contact with the vehicle 462, contacts 1 and 2 of the limit switches 190L and 190R close due to the fully extended positions of the cylinders. Then, relay coils 326 and 330 are energized through contacts 1 and 2 of the limit switches 190L and 190R. Energization of coils 326 and 330 transfers contacts 326a and 330a to interrupt both of the holding circuits for relay coil 334. Coil 334 is thus deenergized, and this in turn deenergizes coils 336 and 338. The extend solenoids 364 and 366 are then deenergized.

Coil 326 is latched in its energized state by a holding circuit extending through relay contact 326a and the closed contacts 5 and 6 of limit switch 190L. Coil 330 is similarly latched in its energized state by a holding circuit that includes contact 330a and the closed contacts 5 and 6 of limit switch 190R. With coil 326 energized, the left retract solenoid 360 is energized through a circuit path that includes contact 336a and contact 326b to ground. Similarly, the right retract solenoid 362 is energized through a path that includes relay contacts 338b and 330b to ground. With both retract solenoids 360 and 362 energized, the cylinders 184 both retract until they are both fully retracted, at which time contacts 5 and 6 of limit switches 190L and 190R open to interrupt the holding circuits for coils 326 and 330. Contacts 326b and 330b then open to deenergize the retract solenoids 360 and 362.

This places the system in the "home" position in which it is armed and ready for another starting sequence. Since the top cylinders 184 fully extended without the buffer heads 192 encountering the top of the vehicle 462, the operator should lower the bridge 124. This can be accomplished by closing switch 320 until the bridge has moved downwardly to a new position.

If, following depression of the WS1 extension switch 312, the buffer heads 192 encounter the top T of the vehicle body prior to full extension of the cylinders 184, brackets 202 will retract relative to brackets 186. Then, contacts 1 and 2 of limit switches 208L and 208R open, and contacts 3 and 4 of these limit switches close. Opening of contacts 1 and 2 of limit switches 208L and 208R interrupts the circuits through relay coils 336 and 338, thus transferring relay contacts 336b and 338a to deenergize the extension solenoids 364 and 366. It is noted that the relay coils 336 and 338 are not deenergized immediately, however. The capacitors C1 and C2 in parallel with the relay coils are in a charged state and discharge through coils 336 and 338 as soon as the open circuit condition is established. Preferably, the capacitors C1 and C2 are selected such that extension of cylinders 184 continues for approximately 0.1 second following interruption of the circuits. This allows cylinders 184 to extend far enough that brackets 102 are in approximately the center of the working range defined between the positions at which the top and bottom fingers 204 and 206 trip the limit switches 208L and 208R. Preferably, the distance between the trip fingers 204 and 206 is approximately 2 1/2 inches, and the extension of the cylinders 184 is terminated when the buffer heads are in about the middle of this range.

Relay coil 328 is energized through the circuit passing through contact 326c and the now closed contacts 3 and 4 of limit switch 208L. Coil 332 is similarly energized through the circuit passing through relay contact 330C and contacts 3 and 4 of limit switch 208R. This energizes the buffer out solenoid 370 through a path defined by contacts 5 and 6 of limit switch 178, contact 356 of switch S5, and relay contacts 332b and 328b to ground.

Consequently, the hydraulic motor 152 is activated to move the carriages 144 away from one another and outwardly along the top tee of the vehicle body. Relay coil 342 is energized in parallel with relay coil 328 through switch contact 350, thus transferring the contact 342a and activating the left buffer motors 196L. Relay coil 344 is similarly energized in parallel with coil 332, thus effecting transfer of contact 344a to activate the right buffer motors 196R.

The top buffing heads 192 are thus driven outwardly from the center of the vehicle top T to the side edge of the vehicle top. The buffers are maintained by their weight in firm contact with the top T and act to effectively buff a strip extending transversely across the entire width of the top T. It should be noted that the buffer heads 192 may initially buff a strip extending across the trunk or hood portion of the vehicle. The top of the vehicle may take on essentially any configuration and may include the trunk hood, the engine hood and the top of the vehicle which overlies the passenger compartment in a typical automobile.

Referring particularly to FIGS. 8 and 9, it is pointed out that the spring 174 causes the buffing head 192 that appears on the right in these figures to initially move to the left across the center line C such that it buffs in an overlapping pattern with the other buffing head. When the tension of spring 174 is relieved, the two to buffing heads thereafter move away from one another to buff the entirety of the transverse working strip.

If carriages 144 travel outwardly to their limits with the buffer heads 192 still in contact with the working surface (the top of the vehicle), contacts 5 and 6 of limit switch 178 open and contacts 7 and 8 of this limit switch close. When contacts 5 and 6 open, the out solenoid 370 is deenergized to stop the buffer travel. At the same time, coil 326 is energized through diode D1 and the now closed 7 and 8 contacts of limit switch 178. Coil 330 is likewise energized through diode D2 and contacts 7 and 8 of limit switch 178. The left retract solenoid 360 is energized through relay contact 336a and the closed relay contact 326b. The right retract solenoid is energized through relay contacts 338b and 330b. Both cylinders 184 are retracted when the retract solenoids are energized.

Relay coil 340 is normally energized through one path extending through diode D3 and contacts 5 and 6 of limit switch 190L. Another independent circuit path that keeps coil 340 normally energized extends through diode D4 and contacts 5 and 6 of limit switch 190R. When both cylinders 184 are fully retracted, contacts 5 and 6 of both limit switches 190L and 190R open, thus deenergizing relay 340. Then, the in solenoid 368 is energized through contacts 3 and 4 of limit switch 178 and relay contact 340a. This causes the carriages 144 to be driven inwardly toward one another as soon as the cylinders 184 have been fully retracted. When carriages 144 are adjacent to one another above the center of the vehicle top T, contacts 3 and 4 of limit switch 178 open to deenergize the in solenoid 368.

If either or both of the buffing heads 192 falls off of the working surface T before the carriages 144 have reached their outer limiting positions, one or both of the buffing heads 192 will tilt in the manner best illustrated in FIG. 6. Then, the corresponding mercury switch MSL or MSR closes due to the tilting of the buffing head. If the left buffing head is tilted to close mercury switch MSL, coil 326 is energized through MSL, thus closing contact 326b and energizing the left retract solenoid 360 through relay contacts 336a and 326b. If the other mercury switch MSR closes, coil 330 is energized to transfer its contacts, including contact 330b. The right retract solenoid 326 is then energized through contacts 338b and 330b.

In this manner, the cylinders 184 are fully retracted as soon as the corresponding buffing heads 192 reach the end of a working surface. When both cylinders 184 have been fully retracted, contacts 5 and 6 of limit switches 190L and 190R open to deenergize coil 340. The in solenoid 368 is then energized through contacts 3 and 4 of limit switch 178 and relay contact 340a. Again, the carriages 144 are driven to their center position and stop when the limiting position is reached.

The buffing heads 192 are able to follow uneven surfaces and to thoroughly buff them. If the surface that is being buffed drops away from the buffing heads, brackets 202 automatically extend by gravity to follow the drop in the surface. If the buffing heads are fully extended such that the top trip fingers 204 trip the limit switches 208L and 208R, contacts 1 and 2 of limit switches 208L and 208R close. Relay coil 336 is then energized by the circuit path extending through relay contact 328c and contacts 1 and 2 of limit switch 208L. Coil 338 is energized by a path extending through contact 332C and the closed contacts 1 and 2 of limit switch 208R. The extend solenoids 364 and 366 are thus energized to extend the cylinders 184 until the buffing heads have retracted within their operating ranges and contacts 1 and 2 of limit switches 208L and 208R open to break the energization circuits for the relay coils 336 and 338. It is again noted that the presence of capacitors C1 and C2 causes the cylinders 184 to extend far enough that the buffing heads are approximately centered within their operating ranges before the extension of the cylinders is terminated.

If the working surface rises, the buffing heads 192 retract and when fully retracted, contacts 7 and 8 of limit switches 208L and 208R close. The retract solenoids 360 and 362 are then energized to retract the cylinders 184 until the buffing heads are within their operating ranges, at which time the retract solenoids are deenergized. If the cylinders 184 are fully retracted and the buffing heads 192 are pushed upwardly to the fully retracted positions, contacts 7 and 8 of all four of the limit switches 190L, 190R, 208L and 208R close. The bridge up solenoid 322 is then energized through contacts 7 and 8 of limit switch 190L and contacts 7 and 8 of limit switch 208L. Solenoid 322 is also energized through a circuit path extending through contacts 7 and 8 of limit switch 190R and contacts 7 and 8 of limit switch 208R. Because there are two independent paths available to energize the bridge up solenoid 322, it is automatically energized to raise the bridge 124 if either of the buffing heads 192 is fully retracted at the same time as the corresponding cylinder 184 is fully retracted. The upward bridge movement continues until contacts 7 and 8 of both limit switches 208L and 208R open.

It should be noted that the bridge 124 is automatically moved upwardly in the same manner whenever either of the top buffing heads is fully retracted and the corresponding top cylinder is fully retracted at the same time.

The cylinders 184 can be retracted at any time by operating the WS1 retract switch to close contact 134 and open contact 316. Coil 326 is then energized through diode D1, contact 314, diode D3 and the closed contacts 5 and 6 of limit switch 190L. Relay coil 330 is energized at the same time through diode D2, switch contact 314, diode D4 and contacts 5 and 6 of limit switch 190R. With coils 326 and 330 energized, the retract solenoids 360 and 362 are energized in the manner indicated previously. At the same time, the holding circuit for relay coil 334 is interrupted due to the opening of switch contact 316.

Either or both of the kill switches S1 or S2 can be activated to disable one of the buffer heads 192 while maintaining the other buffer head in operation. Activation of switch S1 opens its contacts 346a and 346b to maintain coil 336 deenergized so that solenoid 364 remains inactive. The third contact 346c closes to bypass contact 328b so that the right buffing head can travel outwardly upon closure of relay contact 332b. Thus, the left buffing head 192 is disabled while the right buffing head continues to operate normally.

Operation of WS2 opens its contacts 348a and 348b to maintain relay coil 338 in a deenergized condition, thus disabling solenoid 366 and preventing the right cylinder 184 from extending. The third contact 348c closes to bypass contact 332b and permit the out solenoid 370 to be energized. Thus, either buffing head 192 can be maintained in the fully retracted position while the other buffing head continues to operate normally.

Switch 350 can be opened to disable coil 342 and the left buffer motors 196L. Similarly, switch 352 can be opened to disable coil 344 and the right buffer motors 196R. By operating switch 354, both contacts 350 and 352 can be opened together to disable the buffer motors 196L and 196R on both buffer heads.

The bridge can be moved upwardly at any time by closing contact 318. Conversely, the bridge can be moved downwardly by closing contact 320.

In the manual mode of operation, switch S5 is moved to the manual position in which contact 356 is open and contact 358 is closed. Then, the solenoids 368 are totally controlled by contacts 308 and 310. To activate the in solenoid 368, switch 308 can be closed to complete a circuit through the solenoid, contacts 3 and 4 of limit switch 178, switch 308 and switch 358. Closure of switch 310 energizes the out solenoid 370 through contacts 5 and 6 of limit switch 178, switch 310 and switch 358.

Referring now to FIG. 18, the side buffing heads 260 are controlled in a similar manner to the top buffing heads 192. When the WS2 extend wobble switch is operated to close contacts 406 and 408, relay coil 388 is energized through switch contact 408, switch contact 422, relay contact 380C and the closed contacts 1 and 2 of limit switch 280L. Relay coil 394 is energized at the same time through switch contact 406, contact 426, relay contact 382C and contacts 1 and 2 of both limit switch 280R. It is noted that contacts 1 and 2 both limit switches 280L and 280R are normally closed because the ramp and roller arrangement provided on each side buffing mechanism normally maintains the buffing heads in the fully extended positions at which contacts 1 and 2 remain closed.

When relay coil 388 is energized, its contact 388a transfer and completes an energizing circuit for the left cylinder extension solenoid 384. Similarly, energization of coil 394 energizes the right cylinder extension solenoid 390 through contact 394a. The two cylinders 254 then extend.

If cylinders 254 extend fully without the buffing heads 264 contacting a work surface, contacts 1 and 2 of the limit switches 296L and 296R close. Relay coil 376 is energized through contacts 1 and 2 of limit switch 296L, and coil 378 is energized through limit switch 296R. Coil R11 is latched in an energized condition through a holding circuit that extends through relay contact 376A, contact 410 and contacts 5 and 6 of limit switch 296L. Coil 378 is similarly latched in the energized state by a holding circuit holding extending through contact 378a, contact 412, and contacts 5 and 6 of limit switch 296R.

With coil 376 energized, the left cylinder retract solenoid 386 is energized through contact 388b and the closed contact 376b. The left cylinder retract solenoid 390 is similarly energized through contact 394b and contact 378b. Both cylinders then retract and when they are fully retracted, contacts 5 and 6 of limit switches 296L and 296 are open, thus breaking the holding circuits for coils 376 and 378. Coils 376 and 378 are then deenergized and the system is in an armed state and ready for another cycle of operation.

If the buffing heads 260 contact a working surface such as one of the sides S of the vehicle body, the platforms 270 retract relative to plates 266. This opens contacts 1 and 2 and closes contacts 3 and 4 of limit switches 280L and 280R. Then, relay coil 380 is energized through contact 376c and the closed contacts 3 and 4 of limit switch 280L. Coil 380 is latched in the energized condition along a path extending through contact 380a, contact 376a, contact 410 and contacts 5 and 6 of limit switch 296L. At the same time, coil 382 is energized through contact 378c and contacts 3 and 4 of limit switch 280R. Coil 382 is latched in the energized state along a holding circuit extending through contact 382a, contact 378a, contact 412, and contacts 5 and 6 of limit switch 296R.

With both coils 380 and 382 energized, the down solenoid 372b is energized through contacts 5 and 6 of limit switch 372, switch contact 430, contact 382b, and contact 380b. At the start of the operating cycle, the buffing heads 260 are raised to the upper portion of the side S they are to buff, and energization of the down solenoid 372 activates motor 222 in an operating mode to drive the buffing heads 260 downwardly along the opposite sides S of the vehicle body. Coil 400 is energized in parallel with coil 380, thus transferring contact 400a and activating the left buffer motors 260L. Similarly, coil 402 is energized in parallel with coil 382 to transfer contact 402a and 402b and energize the right drive motors 260R. The buffer pads 264 are thus driven in their orbital paths as the buffer heads 260 are driven downwardly along the opposite sides S of the vehicle. This causes each vehicle side S to be buffed in a vertical strip extending along it from top to bottom.

When the buffer heads have reached their down travel limit, contacts 5 and 6 of limit switch 372 open, and contacts 7 and 8 close. Relay coil 376 is then energized through diode D6 and the closed contacts 7 and 8 of limit switch 372. Coil 378 is likewise energized through diode D7 and contacts 7 and 8 of limit switch 372. With coils 376 and 378 energized, the retract solenoids 386 and 392 are energized and the cylinders 254 are retracted.

Like the top buffer heads 192, the side buffing heads 260 are able to follow uneven surfaces while thoroughly buffing them. If the surface falls away from the side buffing heads, the action of the weighted roller 294 on ramp surface 282 causes the buffing head 262 to extend and thus follow the uneven surface. When the buffing heads are fully extended, contacts 1 and 2 of limit switches 280L and 280R are closed. Coil 388 is energized through relay contact 380c and contacts 1 and 2 of limit switch 280L. Coil 394 is energized through relay contact 382c and contacts 1 and 2 of limit switch 280R. Energization of coils 388 and 394 transfers their contacts 388a and 394a to energize the extension solenoids 384 and 390. The hydraulic cylinders 254 are thus extended to allow the buffing heads 260 to continue to follow the uneven surface. When the buffing heads are again retracted to open contacts 1 and 2 of limit switches 280L and 280R, the ram extension circuits are interrupted through the relay coils 388 and 394. However, since capacitors C3 and C4 are fully charged, they discharge through the relay coils and maintain the coils in an energized state for a period of approximately 0.1 second following interruption of the circuit. This allows the cylinders 254 to extend far enough that the buffing heads are positioned near the centers of their 2½ inch working range between the fully extended and fully retracted positions.

If the surface inclines toward the buffing heads 260, the buffing heads retract and when fully retracted, contacts 7 and 8 of limit switches 280L and 280R close. Then, the left cylinder retract solenoid 386 as energized through contact 388b, and contacts 7 and 8 of limit switch L8. The right cylinder retract solenoid 392 is energized through contact 394b and contacts 7 and 8 of limit switch 280R. The cylinders 254 are retracted and continue to retract until the buffing heads extend far enough that contacts 7 and 8 of the limit switches 280L and 280R are open.

When the WS2 retract switch is activated, relay coil 398 is energized through switch contact 416 and contact 418. Coil 398 is thereafter latched in the energized state along a holding circuit that includes contact 398a, diode D9 and contacts 5 and 8 of limit switch 296R. A second and independent holding circuit for coil 398 is established through contact 398a, diode D10 and contacts 5 and 6 of limit switch 296L. Relay coil 376 is energized through diode D6 and contact 398b. Relay coil 378 i energized through diode D7 and contact 398a. Contacts 376b and 378b then close, and the cylinder retract solenoids 386 and 392 are energized to retract the hydraulic cylinders 254. When the rams are fully retracted, contacts 5 and 6 of limit switches 296L and 296R open to deenergize coil 398, thus deenergizing the cylinder retract solenoids 386 and 392.

The S6 kill switch may be operated to disable the left side buffing head 260 while maintaining the right side buffing head 260 in operation. Opening of the S6 contact 422 disables the left side cylinder extension circuit. Closing of contact 424 provides a bypass for contacts 380b so that the buffer travel system can operate whenever the other contact 382b is closed. Conversely, operation of the S7 kill switch opens contact 426 to disable the right cylinder extension circuit, thus disabling the right side buffer. Closure of contact 428 provides a bypass for contact 382b so that the buffer travel motor can drive the left side buffer downwardly along the left side of the vehicle body. In this manner, either one of the side buffer heads 260 can be disabled and remains fully retracted while the other side buffer head operates in the normal fashion.

Opening of switch 58 disables relay coil 400 to prevent the left side buffer motors 260L from being turned on. Switch 59 can be opened to similarly disable coil 402 and the right side buffer motors 260R.

In this manner, the top buffing heads 192 buff a horizontal strip extending transversely across the top T of the vehicle while the side buffing heads 260 buff vertical strips on the opposite sides of the vehicle. The buffing heads 192 and 260 normally buff at the same time, and the side strips and top strip are aligned.

When the buffing heads 192 and 260 have completed each cycle and have retracted and been returned to the "home" position, the operator moves the machine through a preselected incremental distance along the tracks 22, 54 and 56 so that additional strips can be buffed adjacent to the previous strips until the entireties of the top T and both sides S have been buffed. The incremental distance the machine moves should be selected to that adjacent strips that are buffed touch or slightly overlap.

To move the machine 10 on the tracks, the operator momentarily depresses the wobble switch WS3 to close the "work" contact WS3a. The work solenoid 374a is then energized through contacts 3 and 4 of limit switch 374, diode D10, contacts 5 and 6 of limit switch 302, contact WS3a and contact 432. When the work solenoid 374a is energized, the drive motor 74 operates in a direction to move the machine in a forward direction. As the machine movement starts, contacts 5 and 6 of limit switch 302 open and contacts 7 and 8 close. Then, the work solenoid 374a is latched along a holding circuit that includes contacts 3 and 4 of limit switch 374, diode D10, contacts 7 and 8 of limit switch 302, relay contact 396a and switch contact 432. Thus, the work solenoid remains energized after switch WS3 is released.

When the machine has moved far enough to bring one of the pegs 304 against the actuator arm of limit switch 302, contacts 5 and 6 of limit switch 302 close and contacts 7 and 8 open. Opening of contacts 7 and 8 of limit switch 302 interrupts the holding circuit for the work solenoid 374a, so it is deenergized and the machine movement stops automatically at the end of the incremental movement cycle.

When the wobble switch WS3 is activated to close the return contact WS3b, the return solenoid 374b is energized through contacts 5 and 6 of limit switch 374, contact WS3b and contact 432. The machine then moves along the tracks in a return or reverse direction. Relay coil 396 is also energized via contact WS3b and contact 432. Coil 396 is latched on a holding circuit that includes contacts 3 and 4 of limit switch 302, contact 396a and contact 432. The return solenoid 374b is then maintained in the energized condition by a circuit that includes contacts 5 and 6 of limit switch 374, diode D9, contacts 3 and 4 of limit switch 302, contact 396a and contact 432. At the end of each return travel cycle, contacts 3 and 4 of limit switch 302 open to break the holding circuit for relay coil 396 and interrupt the energizing circuit for the return solenoid 374b.

When switch S10 is in the manual setting, ground potential is applied via contact 434 to one side of each contact WS4a and WS4b of wobble switch WS4. Then, closure of contact WS4 a completes a circuit for the work solenoid 374a through contacts 3 and 4 of limit switch 374. Likewise, contact WS4b directly control the return solenoid 374b via contacts 5 and 6 of limit switch 374.

The S11 switch 436 may be used to require that the side buffing heads be in an automatic down travel condition before the top buffing heads can extend and commence their operation in the automatic or manual mode. When the side buffing heads are in automatic down travel, switch 436 receives a ground signal applied through contacts 382b and 380b. When switch 436 is closed, this ground signal is transmitted through switch 436 to one side of relay coil 334, thus energizing it and placing the top buffing heads in the automatic mode.

It should be understood that the buffing machine 10 may be equipped with a spraying device or other device for applying wax or some other vehicle treatment substance to the surfaces T and S of the vehicle body which are to be buffed, or to the buffer pads 194 and 264. It is also to be understood that the buffer pads can be replaced with sanding pads or other devices that are suitable for treating the vehicle body in desired manner, including welding, sand blasting, painting or otherwise finishing the vehicle body surfaces. Virtually any type of vehicle can be treated by the machine, including automobiles, trucks, buses, boats and aircrafts.

The control system may make use of solid state switching rather than the relay-based system disclosed herein. Alternatively, a computer controlled system can be used. The outline of the surface to be treated can be traced, and an encoder can be used to inform the computer of the location of the surface borders. Then, the machined can be operated automatically by the computer to extend and retract the hydraulic cylinders, move the carriages which carry the cylinders and the bridge, and advance the machine in a manner to treat the surface areas defined within the encoded surface borders.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope hereof, it is to be understood that all matter herein set forth or shown in the accompanying drawings is to be interpreted as illustrative and not in a limiting sense.

Having thus described the invention, we claim:

1. Apparatus for treating a vehicle body having opposite sides and a top, said apparatus comprising:
    a frame including a pair of upright columns spaced apart from one another;
    a carriage on each column mounted for up and down movement thereon;
    means for moving each carriage up and down on the corresponding column;
    a pair of side treatment heads mounted on the respective carriages for generally horizontal extension and retraction toward and away from the opposite sides of a vehicle body positioned between said columns;
    a substantially horizontal bridge extending between said columns at an elevated position to span the top of the vehicle body;
    an overhead carriage mounted on said bridge for movement lengthwise thereon;
    means for moving said overhead carriage along the bridge;
    a top treatment head mounted on said overhead carriage for generally vertical extension and retraction toward and away from the top of the vehicle body;
    treatment means on each treatment head for effecting a preselected treatment of the vehicle body when extended adjacent thereto and activated;
    means for selectively extending and retracting each of said treatment heads; and
    means for selectively activating said treatment means of each treatment head to effect said preselected treatment of the sides and top of the vehicle.

2. Apparatus as set forth in claim 1, wherein said treatment means on each treatment head comprises a plurality of pads each mounted for movement on the treatment head in a prescribed path and engageable with the vehicle body upon extension of the treatment head adjacent thereto.

3. Apparatus as set forth in claim 2, wherein said prescribed path for each pad is an orbital path and said means for selectively activating said treatment means of each treatment head comprises power means for effecting movement of each pad in said orbital path.

4. Apparatus as set forth in claim 3, wherein each pad comprises a buffing pad for buffing the vehicle body when the pad is moved in said orbital path in contact with the vehicle body.

5. Apparatus as set forth in claim 1, including a universal joint coupling each treatment head with the corresponding carriage, thereby permitting the treatment heads to traverse uneven surfaces on the vehicle body.

6. Apparatus for effecting a preselected treatment of a vehicle body having opposite sides and a top, said apparatus comprising:
    a rigid frame including a pair of upright columns spaced apart a distance sufficient to accommodate the vehicle body therebetween;
    means for mounting said frame in a manner permitting movement thereof in a linear path extending longitudinally of a vehicle body positioned between said columns;
    drive means for driving said frame along said linear path;
    a carriage on each column mounted for up and down movement thereon;
    power means for effecting up and down movement of said carriages on the respective columns;
    a pair of side treatment heads each carrying treatment means for effecting a preselected treatment of the sides of the vehicle when activated;
    means for mounting said side treatment heads on the respective carriages for generally horizontal extension and retraction toward and away from the opposite sides of a vehicle body positioned between said columns;
    a substantially horizontal bridge having opposite ends connected with the respective columns in a manner permitting the bridge to move up and down on the columns while maintaining a horizontal orientation;
    means for selectively moving said bridge up and down on the columns;
    a pair of overhead carriages mounted on said bridge for reciprocating movement thereon toward and away from one another;
    power means for effecting movement of said overhead carriages toward and away from one another in unison on said bridge;
    a pair of top treatment heads each carrying treatment means for effecting a preselected treatment of the vehicle body top when activated;
    means for mounting said top treatment heads on the respective overhead carriages for generally vertical extension and retraction toward and away from the top of a vehicle positioned beneath said bridge and between said columns;
    means for selectively extending and retracting each of said side treatment heads; and
    means for selectively activating said treatment means of each side and top treatment head to effect said preselected treatment of the sides and top of the vehicle body.

7. Apparatus as set forth in claim 6, including means for deactivating said drive means automatically each time said frame has traveled a preselected incremental distance along said linear path.

8. Apparatus as set forth in claim 6, wherein:
said means for mounting said frame comprises a pair of substantially parallel tracks and a base on each column having wheel means riding on the tracks; and
said drive means includes means for advancing said bases in unison along the track and means for stopping advance of the bases each time the bases have advanced a preselected incremental distance.

9. Apparatus as set forth in claim 6, wherein said means for mounting said side treatment heads includes:
a power cylinder for each side treatment head mounted on the corresponding carriage, each cylinder being extensible and retractable between fully extended and fully retracted positions thereof;
a bracket coupled with each cylinder for extension and retraction therewith;
means for mounting each side treatment head for extension and retraction relative to the corresponding bracket between fully extended and fully retracted positions of the treatment head; and
yieldable means for urging each side treatment head in a direction to extend relative to the corresponding bracket,
said means for selectively extending and retracting said side treatment heads comprising means for effecting extension and retraction of the power cylinder for each side treatment head.

10. Apparatus as set forth in claim 9, wherein said yieldable means comprises:
an inclined ramp on each side treatment head; and
a weight on each bracket engaging the corresponding ramp and mounted to ride up and down thereon in a manner to urge each ramp away from the corresponding bracket under the influence of the weight.

11. Apparatus as set forth in claim 9, wherein said means for effecting extension and retraction of the power cylinder for each side treatment head comprises:
means for extending each power cylinder when the corresponding side treatment head is in the fully extended position thereof relative to the corresponding bracket;
means for retracting each power cylinder when the corresponding side treatment head is in the fully retracted position thereto relative to the corresponding bracket; and
means for stopping extension and retraction of each power cylinder when the corresponding side treatment head is between the fully extended and fully retracted positions thereof.

12. Apparatus as set forth in claim 11, including means for retracting each cylinder to the fully retracted position thereof when the cylinder and the corresponding treatment head are both in the fully extended positions.

13. Apparatus as set forth in claim 6, wherein said means for mounting said top treatment heads includes:
a power cylinder for each top treatment head mounted on the corresponding overhead carriage, each cylinder being extensible and retractible between fully extended and fully retracted positions thereof;
a bracket coupled with each cylinder for extension and retraction therewith; and
means for mounting each top treatment head for extension and retraction relative to the corresponding bracket between fully extended and fully retracted positions of the top treatment head, each top treatment head being urged to the fully extended position under the influence of gravity,
said means for selectively extending and retracting said top treatment heads comprising means for effecting extension and retraction of the power cylinder for each top treatment head.

14. Apparatus as set forth in claim 13, including means for retracting each cylinder to the fully retracted position thereof when the cylinder and the corresponding top treatment head are both in the fully extended positions.

15. Apparatus as set forth in claim 13, including means for effecting upward movement of said bridge when either cylinder and the corresponding top treatment head are both in the fully retracted positions.

16. Apparatus as set forth in claim 13, wherein said means for mounting said side treatment heads includes:
a power operated cylinder for each side treatment head mounted on the corresponding carriage, each power operated cylinder being extensible and retractable between fully extended and fully retracted positions thereof;
a bracket plate coupled with each power operated cylinder for extension and retraction therewith;
means for mounting each side treatment head for extension and retraction relative to the corresponding bracket plate between fully extended and fully retracted positions of the side treatment head; and
yieldable means for urging each side treatment head in a direction to extend relative to the corresponding bracket plate,
said means for selectively extending and retracting said side treatment head comprising means for effecting extension and retraction of the power operated cylinder for each side treatment head.

17. Apparatus as set forth in claim 16, wherein said means for effecting extension and retraction of the power cylinders and power operated cylinders comprises:
means for extending each cylinder when the corresponding treatment head is in the fully extended position thereof;
means for retracting each cylinder when the corresponding treatment head is in the fully retracted position thereof; and
means for stopping extension and retraction of each cylinder when the corresponding treatment head is between the fully extended and fully retracted positions thereof.

18. Apparatus as set forth in claim 6, wherein:
said top treatment heads are spaced apart a predetermined distance when said overhead carriages are adjacent one another on said bridge; and
said power means for effecting movement of said overhead carriages includes means for effecting movement of said overhead carriages initially in the same direction when the overhead carriages are adjacent one another to move one carriage toward the other carriage through at least said predetermined distance and to thereafter move said one carriage away from said other carriage.

19. Apparatus as set forth in claim 6, wherein said treatment means on each treatment head comprises a plurality of buffing pads mounted on each treatment head for movement thereon in an orbital path for buffing the vehicle body when activated in contact therewith.

* * * * *